United States Patent
Creel et al.

(10) Patent No.: US 11,526,772 B2
(45) Date of Patent: Dec. 13, 2022

(54) ACCELERATED REASONING GRAPH EVALUATION

(71) Applicant: Cotiviti, Inc., Atlanta, GA (US)

(72) Inventors: Christopher Taylor Creel, Atlanta, GA (US); Bharath Kumar Reddy Lingannagari, Sandy Springs, GA (US); Christopher Shawn Watson, Alpharetta, GA (US)

(73) Assignee: Cotiviti, Inc., Atlanta, GA (US)

( * ) Notice: Subject to any disclaimer, the term of this patent is extended or adjusted under 35 U.S.C. 154(b) by 868 days.

(21) Appl. No.: 16/272,584

(22) Filed: Feb. 11, 2019

(65) Prior Publication Data
US 2020/0257988 A1   Aug. 13, 2020

(51) Int. Cl.
*G06F 16/901* (2019.01)
*G06N 5/02* (2006.01)
*G06F 12/0864* (2016.01)
*G06F 9/30* (2018.01)
*H04L 9/06* (2006.01)

(52) U.S. Cl.
CPC ......... *G06N 5/022* (2013.01); *G06F 9/30021* (2013.01); *G06F 12/0864* (2013.01); *G06F 16/9024* (2019.01); *H04L 9/0643* (2013.01)

(58) Field of Classification Search
CPC ........ G06N 5/022; G06N 5/046; G06N 5/003; G06F 9/30021; G06F 12/0864; G06F 16/9024; H04L 9/0643
See application file for complete search history.

(56) References Cited

U.S. PATENT DOCUMENTS

| 5,249,258 | A  | * | 9/1993 | Hisano | G06N 7/04 706/50 |
| 5,343,554 | A  |   | 8/1994 | Koza et al. | |
| 5,778,157 | A  |   | 7/1998 | Oatman et al. | |
| 7,917,455 | B1 | * | 3/2011 | Dobson | G06N 20/00 706/12 |
| 8,352,409 | B1 | * | 1/2013 | Satish | G06N 20/00 706/52 |
| 8,375,450 | B1 | * | 2/2013 | Oliver | G06F 21/564 713/181 |
| 2003/0135453 | A1 |   | 7/2003 | Caulfield et al. | |
| 2004/0044988 | A1 | * | 3/2004 | Schene | G06F 9/45508 717/138 |
| 2007/0179966 | A1 |   | 8/2007 | Li et al. | |
| 2008/0005628 | A1 |   | 1/2008 | Underdal et al. | |

(Continued)

OTHER PUBLICATIONS

International Search Report and Written Opinion from International Application No. PCT/US2018/033194 dated Aug. 8, 2018.

(Continued)

*Primary Examiner* — Shin-Hon (Eric) Chen
*Assistant Examiner* — Abdullah Almamun
(74) *Attorney, Agent, or Firm* — Perkins Coie LLP

(57) ABSTRACT

Embodiments disclosed herein relate to methods, systems, and computer programs for automatically determining an outcome associated with a reasoning graph, based on one or more data sets. The methods, systems, and computer programs compare hash values associated with different data sets to determine if they match to assign the outcome associated with a pre-existing hash to the later provided hash and data set associated therewith.

23 Claims, 8 Drawing Sheets

(56) References Cited

U.S. PATENT DOCUMENTS

| | | | |
|---|---|---|---|
| 2008/0279205 A1* | 11/2008 | Sgouros | H04L 47/2441 370/408 |
| 2010/0306167 A1* | 12/2010 | Crawford | G06F 16/904 706/60 |
| 2011/0213981 A1 | 9/2011 | Griffin | |
| 2011/0307435 A1 | 12/2011 | Overell et al. | |
| 2014/0108321 A1 | 4/2014 | Buchanan et al. | |
| 2015/0269691 A1 | 9/2015 | Bar Yacov et al. | |
| 2016/0156595 A1 | 6/2016 | Wu et al. | |
| 2017/0083637 A1 | 3/2017 | Cho et al. | |
| 2017/0220698 A1 | 8/2017 | Dietrich et al. | |
| 2018/0246780 A1* | 8/2018 | Acharya | G06F 11/0796 |
| 2019/0073420 A1* | 3/2019 | Agapiev | G06F 16/9024 |
| 2019/0080063 A1* | 3/2019 | Rice | G06N 5/003 |
| 2019/0220524 A1* | 7/2019 | Costabello | G06F 16/24578 |
| 2020/0065395 A1* | 2/2020 | Pereira | G06F 16/24578 |

OTHER PUBLICATIONS

U.S. Appl. No. 15/610,945, filed Jun. 1, 2017.
International Search Report and Written Opinion from International Application No. PCT/US2018/054367 dated Dec. 3, 2018.
Non-Final Office Action for U.S. Appl. No. 15/610,945 dated Apr. 6, 2020.
Extended European Search Report dated Sep. 29, 2022 for European Patent Application No. 20756703.3 (14 pages).
Salakhutdinov, Ruslan, et al., "Semantic hashing," International Journal of Approximate Reasoning 50, 969-978, 2009.

* cited by examiner

ACCELERATED REASONING GRAPH EVALUATION

BACKGROUND

Data is referenced and used by computer programs. Data may be used or incorporated in any number of formats. Data is typically incorporated into an executable program and used by the program as necessary. For example, the data can be queried by one or more functions to provide answers or determinations.

Some queries examine relative amounts of data, a type of data, a state or status indicated by the data, or some other variable relative to some standard or threshold. Such queries may include functions that are performed utilizing the data.

When large amounts of data are processed, the computing power of a computing system may be a limiting factor in the speed at which the data is processed.

SUMMARY

Embodiments disclosed herein relate to methods, systems, and computer program products for accelerated reasoning graph evaluation of data to provide outcomes associated therewith. In an embodiment, a method of automatically determining an outcome associated with a reasoning graph is disclosed. The method includes inputting at least one hash corresponding to at least one data set into a database, wherein the at least one hash is generated based on the at least one data set and the at least one data set is used to determine at least one outcome of at least one reasoning function of the reasoning graph. The method includes providing one or more additional data sets. The method includes generating a new hash for at least a portion of the one or more additional data sets. The method includes comparing the new hash to the at least one hash to determine if the new hash matches the at least one hash. The method includes responsive to the comparing, mapping the at least one outcome corresponding to the at least one hash with the at least a portion of the one or more additional data sets used to determine the new hash if the new hash matches the at least one hash, or, running the at least a portion of the one or more additional data sets through the at least one reasoning function of the reasoning graph to determine at least one new outcome for the at least a portion of the one or more additional data sets if the new hash does not match the at least one hash.

In an embodiment, a method of automatically determining an outcome associated with a reasoning graph is disclosed. The method includes providing a first reasoning function hash corresponding with a first reasoning function data set used in one or more operations at a first reasoning function to determine a first outcome at the first reasoning function. The method includes mapping the first reasoning function hash to the first outcome. The method includes providing one or more additional data sets. The method includes generating a new hash for at least a portion of the one or more additional data sets, wherein the at least a portion of the one or more additional data sets includes data used to perform the one or more operations at the first reasoning function. The method includes comparing the new hash to the first reasoning function hash to determine the presence of a match therebetween. The method includes, responsive to comparing the new hash to the first reasoning function hash: outputting the first outcome corresponding to the first reasoning function hash, the first reasoning function data set, and the at least a portion of the one or more additional data sets if the new hash and the first reasoning function hash match, or, performing the one or more operations at the first reasoning function with the at least a portion of the one or more additional data sets to determine a new first outcome at the first reasoning function, if the new hash and the first reasoning function hash do not match.

In an embodiment, a computer program product for automatically determining an outcome of at least a portion of a reasoning graph is disclosed. The computer program product includes a machine readable program stored on a non-transitory computer readable medium. The machine readable program includes an input module configured for accepting input of at least one hash corresponding to at least one data set; a reasoning graph, wherein the reasoning graph includes a plurality of leaf nodes each defining an insight, a plurality of reasoning paths each terminating at a leaf node, and a plurality of reasoning functions, wherein each reasoning function defines a portion of the plurality of reasoning paths and defines queries and inputs for making a discrete decision with data at a specific point along a selected reasoning path; one or more additional data sets; and one or more new hashes corresponding to at least a portion of the one or more additional data sets. The machine readable program includes a comparison module for comparing the at least one hash to the one or more new hashes to determine a match therebetween. The machine readable program includes a mapping module configured to map at least one outcome corresponding to the at least one hash to the at least a portion of the one or more additional data sets used to determine the one or more new hashes if any of the one or more new hashes matches the at least one hash. The machine readable program includes an analysis module configured to run the at least a portion of the one or more additional data sets through at least one reasoning function of the plurality of reasoning functions in the reasoning graph to determine at least one new outcome for the at least a portion of the one or more additional data sets if any of the one or more new hashes do not match the at least one hash. The machine readable program includes an output module configured to output the at least one outcome if any of the one or more new hashes match the at least one hash or output the at least one new outcome if any of the one or more new hashes do not match the at least one hash.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments disclosed herein relate to methods, computer program products, and systems for accelerated reasoning graph evaluation of data. The embodiments of methods and systems disclosed herein utilize reasoning graphs to determine an insight based on discrete data sets. The reasoning graphs include a plurality of reasoning functions that query data, along a reasoning path through the reasoning graph, to arrive at an insight at a terminal leaf node in the reasoning graph. The reasoning graphs may apply to many individual's or entity's data and therefore provide a many-to-one correlation therebetween. A code (e.g., checksum or hash value) may be produced using the data set that is run through the reasoning graph. Accordingly, the insights determined from the methods and systems herein may be correlated to the code. If later codes match the original code, the same insight from the original code may be assumed for the later codes. Such code matching, may allow shortcutting of at least a portion of the reasoning graph to determine an insight from the reasoning graph.

Reasoning graphs includes a plurality of leaf nodes each of which provide an insight based on the data input into the reasoning graph, a plurality of reasoning paths each of which terminate in one of the plurality of leaf nodes, and a plurality of reasoning functions. Each of the plurality of reasoning functions defines criteria for making a discrete decision using the data at a point along a reasoning path. The reasoning path to a specific insight may be encoded at the leaf node (e.g., insight) and includes only reasoning functions and discrete decisions in the reasoning path. Because data from many different individuals can travel down the same reasoning path, disclosing only the insight, reasoning path, and discrete decisions therealong breaks any possible one-to-one relationship between the reasoning path and the uniquely identifiable data. Accordingly, the insight and even the reasoning path can be disclosed without disclosing the personally identifiable data used to arrive at the insight. By utilizing hashes rather than the data underlying the hashes, the personally identifiable data may be further removed from any insights based thereon, all while allowing for faster determination than conventional data processing techniques.

Figure 1:
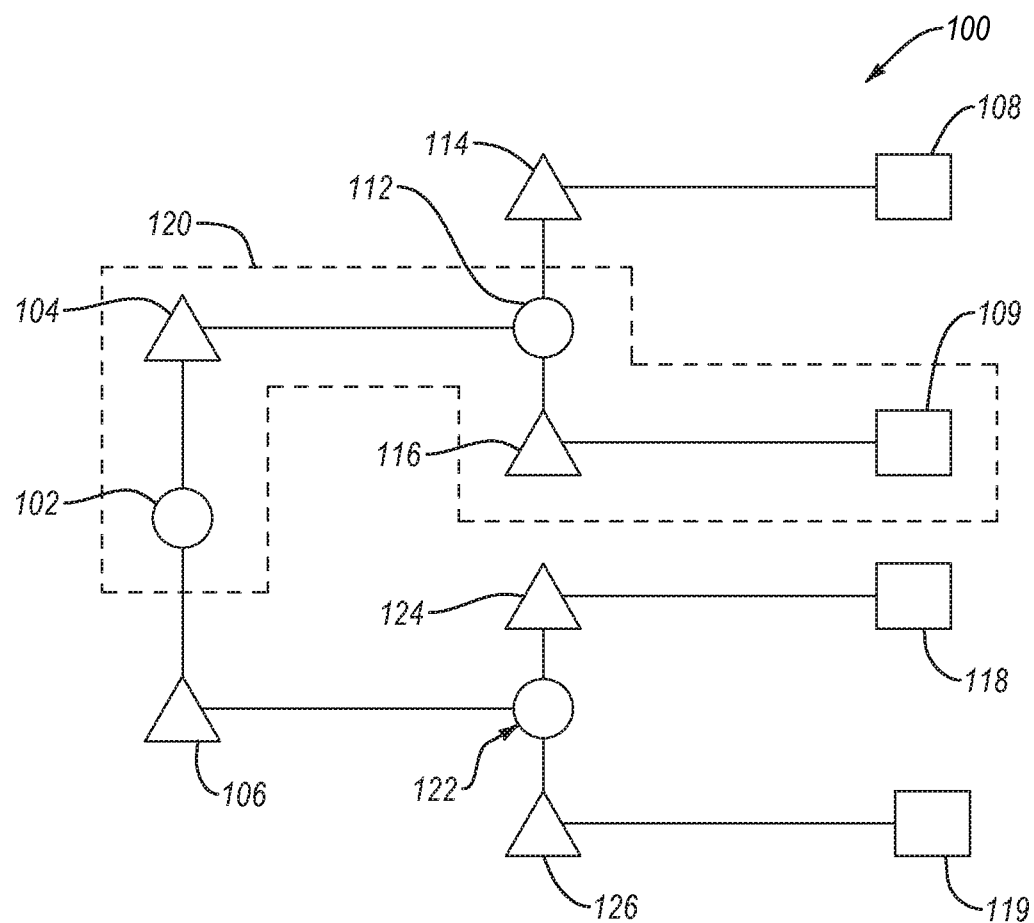
FIG. 1 is a schematic illustration of reasoning graph for determining an insight using data, according to an embodiment.

FIG. 1 is a schematic of reasoning graph 100 for determining an insight using data, according to an embodiment. The reasoning graph 100 includes a plurality of reasoning functions 102, 112, and 122. Each reasoning function 102, 112, or 122 includes a query and at least two possible discrete decisions (104 or 106, 114 or 116, 124 or 126) or outcomes of the query which are determined using the data. The data may be provided in a table, a database, or string. The data may be accessed and evaluated by the reasoning functions via execution of machine readable code by a processor or system. The discrete decisions 104 or 106, 114 or 116, and 124 or 126 may be made at the reasoning function(s) 102, 112, or 122 by answering the respective query with the data. The discrete decisions, such as decisions 104 or 106, may lead to another reasoning function such as 112 or 122, and eventually to an insight such as 108, 109, 118, or 119. For example, the first reasoning function 102 may query as to whether a healthcare provider has submitted a claim for a specific medication. If a claim was submitted, then the discrete decision 104 is a yes or true and the analysis of the data presented for determination of an insight advances to the second reasoning function 112. If a claim was not submitted, then an alternative reasoning path (not shown) would advance to the insight 118 or 119. The insight 118 or 119 may include instructions that no action should be taken (e.g., claim should not be paid and/or no prescription should be provided).

While a limited number of reasoning functions (e.g., 102, 112, and 122), discrete decisions (e.g., 104, 106, 114, 116, 124, or 126), and insights (e.g., 108, 109, 118, and 119) are disclosed with respect to the reasoning graph 100, example reasoning graphs may include more or fewer (e.g., any number of) reasoning functions, discrete decisions, and insights.

A specific path through the reasoning graph 100, which includes all reasoning functions, data, and discrete decisions used to arrive at a specific insight, is referred to as a reasoning path 120. Depending upon the values of the data (e.g., data values from fields within the data or data set) that is analyzed with the reasoning graph 100, the reasoning path(s) 120 may vary. Put another way, differing data sets may have differing reasoning paths (and insights) through the same reasoning graph. Such differences are due to the various outcomes of reasoning functions that operate using the data. For example, a set of data that includes a field with a discrete value above a maximum limit defined in a reasoning function will direct the reasoning path in a different direction through the reasoning graph than a set of data with a field with a discrete value below the maximum limit.

Upon querying the data and determining the discrete decision at the first reasoning function 102, the reasoning path 120 advances to the second reasoning function 112. The second reasoning function 112 may query another portion of the data (e.g., the amount of units of medication billed for a drug code corresponding to the prescribed medication on the date of service and/or a timeframe extending therefrom). For example, the second reasoning function 112 may compare the data to some threshold amount (e.g., maximum or minimum allowable units). Responsive to the second reasoning function 112, a system processing the reasoning graph 100 may determine with the data, if the specific field in the data (e.g., number of units of medication billed for the drug code) exceeds or falls short of the threshold amount. The threshold amount can be set according to a policy (e.g., an FDA recommendation, insurance limits, etc.). If the number of units in the field of the data falls short of the threshold amount, then a negative or false value may be given for the discrete decision 116 and the reasoning path would advance to the insight 109. The insight 109 may prescribe that no adverse action should be taken with respect to the claim corresponding to the data (e.g., a claim may proceed as submitted or medication should be filled as submitted).

If the number of units exceeds the threshold value, then the discrete decision 114 includes an affirmative or true value. In some embodiments, the discrete decision corresponding to a reasoning function, such as reasoning function 112, may additionally or alternatively include the total number of units, the number of units exceeding the maximum threshold, or the number of units that the submission is under a minimum threshold). Responsive to the determination that the number of units submitted exceeds the threshold value, given by the discrete decision 114, the reasoning path (not shown) advances to the insight 108. The insight 117 may provide that the number of units be reduced to comply with the policy (e.g., FDA recommendation).

Each insight 108, 109, 118 or 119 may include an insight identifier (ID), which encodes the reasoning path used to reach the insight. For example, the insight for the leaf node containing the insight 109 includes the reasoning path 120, and each reasoning function 102, 112 and discrete decision 104 and 116 therein. The insight may include the specific fields, reasoning functions, and discrete decisions contained within the reasoning path used to reach the insight. Similarly, each discrete decision may include an outcome identifier (outcome ID) which includes the specific fields, reasoning functions, and discrete decisions contained within the (at least a partial) reasoning path used to reach the outcome. Accordingly, the data, reasoning functions, discrete decisions, etc. utilized to reach a specific point in the reasoning graph 100 may be captured and utilized in later processes. In some embodiments, substantially no personally identifiable data is disclosed in the insight or outcome. Rather, only data containing values for fields corresponding to some entity, event, individual, etc. is included in the insight or outcome.

Each insight may include a textual explanation of the outcome of the insight and/or of each portion of the reasoning path corresponding thereto. For example, the insight 108 may include a textual explanation of each portion of the reasoning path 120, such as each reasoning function and discrete decision therein. The insight 108 may include a textual explanation of the outcome of the reasoning path, such as explaining that the submitted amount exceeded the amount allowed under the policy and that an adjustment in the amount is required to comply with the policy. In some embodiments, the insight (e.g., 108) may also explain at least some of the policy underlying the reasoning functions and discrete decisions therein. For example, the insight 108 may explain that the adjustment in the amount of medication requested was provided to comply with FDA guidelines with respect to the corresponding medication. As noted above, the insights 108, 108, 118, or 119 each include a unique insight ID (which may be encoded and output to an entity).

Reasoning graphs 100 present a relatively effective way of automatically resolving requests or finding answers to specific questions based on fixed data sets. However, reasoning graphs present a computational burden in answering each reasoning function along a reasoning path. For example, the data corresponding to a query in a specific reasoning function is fetched and processed against the framework of the reasoning function, for each reasoning function in a reasoning path. Such computation and processing requirements can take a relatively long time to run or bog down a computer system such as when many queries are run simultaneously. By identifying commonalities between data sets and outcomes (e.g., discrete decisions and/or insights) based thereon, a system, a processor, or machine readable and executable computer program can drastically reduce the compute time and computational burden of resolving requests or finding answers to specific questions. The reductions are based on the determined commonalities between data sets. For example, a hash may be produced for each data set which is run through a specific reasoning graph. The hash may be associated (e.g., electronically linked) with the corresponding outcome of the reasoning graph which is processed with the data set. Subsequently, the hash corresponding to the data set may be compared to a new hash corresponding to an additional (e.g., new) data set. If the hash matches the new hash, the outcome (e.g., discrete decision or insight) is assumed to be same for the additional data set. Accordingly, comparing hashes of known data sets and their corresponding outcomes to new hashes based on additional data sets can provide a shortcut to performing at least some of the reasoning functions in a reasoning graph to answer a question utilizing the additional data set.

Different data sets (e.g., data sets which correspond to different entities, scenarios, or individuals) can have same reasoning path or discrete portions thereof, such as answers to specific reasoning functions. Depending upon the values of the data set (e.g., of fields within the data set) which is analyzed with the reasoning graph 100, the reasoning path(s) 120 may be identical in one or more aspects. Put another way, data sets corresponding to different entities, events, or individuals may have identical reasoning paths (and insights) when examined with the same reasoning graph. Such similarities are due to the identical outcomes of reasoning functions that operate using the values within the data sets. For example, a data set that includes a field with a discrete value above a minimum threshold defined in a reasoning function will direct the reasoning path in the same direction through the reasoning graph as another data set with a field with the same value. Accordingly, certain assumptions can be made to eliminate unnecessary duplication of steps and by extension reduce computational burden. For example, if data from a later presented data set has the same value(s) as a previously presented data set which has a known insight, then the insight of the later presented data set can safely be assumed to be the same as the previously presented data set.

By making a hash based on the at least one data set prior to processing the at least one data set with the reasoning graph 100, the outcome of the reasoning graph (or a portion thereof) reached with the at least one data set may be directly associated with the hash. For example, an insight may be produced which includes an ultimate disposition of a question for which the data is queried, data from the data set, at least one reasoning function in a reasoning path to the insight, and discrete decisions made at the at least one reasoning function. The hash and corresponding insight (or other outcome) may be correlated to each other in a database, library, or look-up table. The hash(es) corresponding to the original at least one data set may be directly compared with new hashes corresponding to additional data sets. Hashes include a plurality of characters produced by a function (e.g., checksum or hash functions/algorithms such as SHA-512, SHA-256, etc.) corresponding to the data values in the data set. If a single character in a data set changes, the hash changes by multiple characters. Accordingly, a difference between the new hash and the original hash provides an indication that the additional data set differs from the original data set by one or more characters. If the new hash matches the original hash, the data sets corresponding thereto are identical and the outcomes are assumed to be identical without running the additional data set through the reasoning graph. For example, a new hash can be directly compared to one or more original hash(es), such as in a look-up table, without running the additional data set or portions thereof through the reasoning graph. Such direct comparison of hashes from different data sets short-cuts (e.g., at least partially eliminates) processing the additional data set with the reasoning graph and therefore reduces computational burden of determining outcomes of queries based on data sets.

Figure 2:
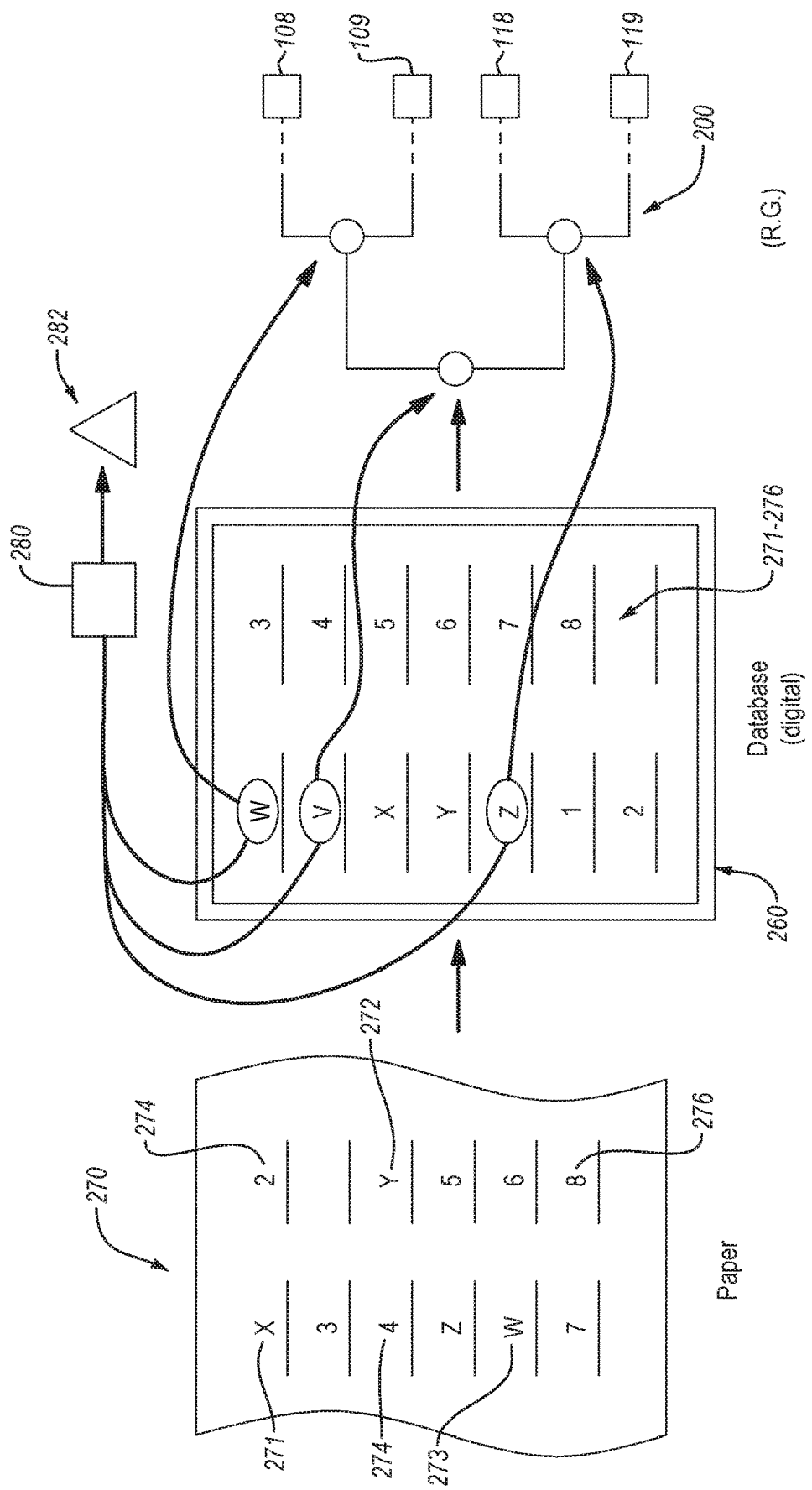
FIG. 2 is a schematic illustration of at least one data set, according to an embodiment.

FIG. 2 is a schematic illustration of at least one data set 260, according to an embodiment. As shown in FIG. 2, the at least one data set 260 may be obtained from a form 270. The at least one data set 260 may include a plurality of values 271-276. The plurality of values 271-276 may be obtained from a plurality of fields in the form 270. For example, the fields may include a space in the form 270 designated for placing a specific piece of information, such as a social security number, an age, an amount, a diagnosis, etc. The form 270 may be paper or electronic. In some embodiments, the form 270 may include a medical form (e.g., chart), a survey, an application (e.g., loan application), a prescription, a request, a bid, or any other source of data. The values 271-276 from the fields in the form 270 may be stored electronically in the at least one data set 260, such as in a database. For example, the values 271-276 may be stored in fields (e.g., designated for a specific type of value) in the data set 260 that correspond to the fields in the form 270, such as in a string, spreadsheet, or other electronic storage format. The values from the respective fields in the form 270 may be manually entered or electronically transferred into the corresponding positions in a database, spread sheet, or other electronic storage format.

In the data set 260, the individual values 271-276 (and any others in the data set) may be electronically access, transferred, or queried by a processor or system that is making a determination using a reasoning graph 200. For example, one or more of the values 271-276 used to form the data set 260 may be selectively queried by the reasoning functions in the reasoning graph 200. The reasoning graph 200 may be similar or identical to the reasoning graph 100 in one or more aspects, such as having at least one insight 108, 109, 118, or 119. As shown, only a subset of the total values stored in the data set 260 may be queried in the reasoning graph 200. In some embodiments, all of the values stored in a data set 260 may be queried by at least one reasoning function in the reasoning graph 200.

One or more of the values 271-276 from the data set 270 may be used to form a hash 282 using a hash function 280. As shown, the hash 282 may be formed utilizing a hash function 280 based on only a subset of the total values stored in the data set 260. For example, the hash function 280 may be composed (e.g., includes machine readable and executable code) to selectively base the hash 282 on a subset of values in the plurality of fields in the data set 260. In some embodiments, the hash function 280 may be composed to form a hash based on all of the values in the all of the fields in the data set 260. The hash 282 may be produced prior to, contemporaneously with, or after the values (that the hash is based upon) are used to query the reasoning functions in the functioning graph 200. For example, a hash may be produced prior to running data from a data set through the reasoning graph 200. In some embodiments, a hash may be based on values (e.g., data) associated with one or more discrete reasoning functions, such as only a portion of a reasoning path.

After processing the data corresponding to a selected individual, entity, event, etc. with the reasoning graph 200, the hash 282 may be correlated (e.g., electronically linked) to the corresponding discrete decision or insight. For example, hash 282 may be correlated to insight 108. The hash 282 and corresponding insight may be stored in a database (e.g., look-up table) for later comparison to new hashes formed from additional data sets. When matches between hashes are found, the additional data is automatically associated with the outcome of the hash stored in the database, thereby eliminating the need to process at least a portion of the additional data in the reasoning graph. In some embodiments, a hash may be made on only a subset of the data set, such as a subset associated with one or more reasoning functions (but not all reasoning functions) in a reasoning path. In such embodiments, matching hashes may allow analysis of additional data sets (e.g., via machine readable and executable programs) to skip to the portion of the reasoning graph where no match between hashes is found.

Figure 3:
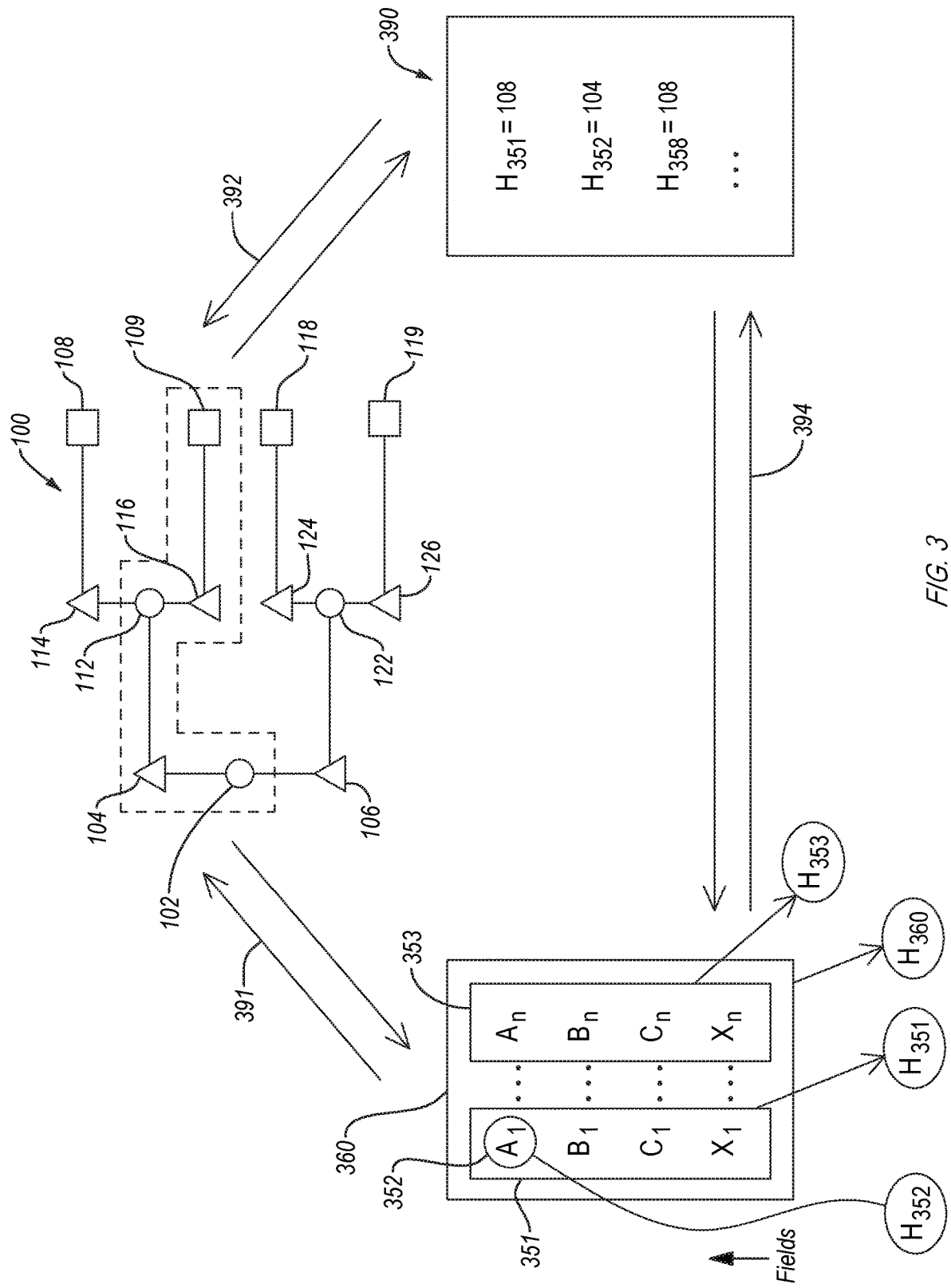
FIG. 3 is a schematic illustration of a data set, associated reasoning graph, and database of associated outcomes, according to an embodiment.

FIG. 3 is a schematic illustration of a data set 360, associated reasoning graph 100, and database 390 of associated outcomes, according to an embodiment. As shown in FIG. 3, the data set 360 can include plurality of fields A-X and a plurality of subsets of data 1-$n$. Each field A-X may correspond to a specific piece of information collected for all subsets 1-$n$. Each of the plurality of subsets of data 1-$n$ may represent data corresponding to a specific individual, event, claim, entity, etc. The subsets are noted by subscript numerals, such as 1 or n. The subset of data may include information stored as values in the plurality of fields $A_1$, $B_1$, $C_1$ through $X_1$. The information stored as a value may include qualitative or quantitative information stored in a discrete field and subset in the data set 360. Though only four fields are shown in FIG. 3, more or fewer fields may be present in data set 360. The fields A-X may include individual values of data stored therein, such as amounts, ages, statuses (e.g., conditions, diagnoses, etc.), or any other individual value or information. The individual values in the fields A-X may vary depending on the information corresponding to a specific individual, event, claim, entity, etc. upon which the information in the fields is based. For example, a patient corresponding to subset 1 labeled 351 may have different values in one or more of fields A-X than a patient corresponding to subset n labeled as 353. In some embodiments, the data in the data set 360 may only include a single subset directed to one individual, entity, event, etc. In such embodiments, the number of fields may be as described above, such as having a sufficient number of fields to hold at least all of the values that are used in the reasoning graph 100.

In some data sets, more fields and/or subsets than necessary to perform the reasoning functions in a reasoning graph may be present. In such embodiments, the reasoning function and/or hash functions may be composed to only operate on those fields and subsets necessary to execute one or more specific reasoning functions or calculate a hash.

At least one hash corresponding to one or more discrete values in the data set 360 may be produced prior to, contemporaneously with, or after the values are run through the reasoning graph 100. For example, at least one hash may be produced which incorporates at least one of the values in a portion of the data set 360, such as hash $H_{351}$ corresponding to the values A-X in subset 1 ($A_1$-$X_1$) shown as subset 351. Similarly, a hash corresponding to only some subsets in a field may be made, such as by using a hash function on the selected values in subsets in the field. As at least some of the values of subset 351 ($A_1$, $B_1$, $C_1$) or subset 352 are utilized by the reasoning functions 102, 112, and 122 of the reasoning graph 100, various outcomes (e.g., 104, 114, or 108) may be correlated to the hash $H_{351}$ or hashes $H_{351}$ and $H_{352}$ corresponding to the values of the subset or all values in the subset. Additional hashes may be made which correspond to values in different fields and/or subsets than the first subset 351. For example, hash $H_{353}$ may correspond to the values in fields A-X for subset n ($A_n$-$X_n$) shown as subset 353 in the data set 360. A hash may be made based on the values of any combination of field(s) and/or subset(s) disclosed herein.

The individual values from fields A-X associated with a specific subset may be selected for use with corresponding reasoning functions 102, 112, or 122 in the reasoning graph 100. It should be understood that more or fewer reasoning functions may be present in example reasoning graphs than those depicted in reasoning graph 100. As shown at arrow 391, the reasoning functions (e.g., via a processor or system executing machine readable instructions) may utilize the values from a specific subset to determine and provide outcomes according to the queries therein. The hash corresponding to the values utilized in the reasoning functions of a reasoning path associated with an outcome (e.g., insight 108) may be associated with the outcome. For example, the hash $H_{351}$ may be automatically correlated 392 (e.g., electronically linked) to the insight 108. The correlation may be stored in a database 390.

In embodiments, the value in subset 352 may be utilized by the reasoning functions 102 to determine discrete decision 104, which may be correlated to the hash $H_{352}$ corresponding to the said value. By including less than all of the values necessary for a full determination of an insight using reasoning graph, one or more portions of the reasoning graph may be skipped upon determining a new hash matches the hash $H_{352}$. For example, if a new hash based on values in an additional data set is determined to match $H_{352}$, then the determination of an insight using the reasoning graph 100 may be started at reasoning function 112. Accordingly, hashes and corresponding outcomes may be utilized to eliminate the computational burden and time associated with executing one or more reasoning functions in a reasoning graph.

A new hash may be compared to the hashes stored in the database 390 to determine if there is a match therebetween. For example, upon comparing a new hash (corresponding to additional data) to existing hashes stored in the database 390 and finding a match therebetween, it may be assumed that the outcome of the reasoning graph for the additional (e.g., new) data is the same as the outcome for existing data corresponding to the existing hash. For example, if hash $H_{353}$ matches hash $H_{351}$, then it can be assumed that the outcome, such as insight 108 (originally determined with subset 351) also applies to the values in the subset 353. This assumption is safely utilized to skip running the additional data subset 353 through the reasoning graph 100, in favor of correlating (e.g., electronically linking) the outcome associated with values of data used to make hash $H_{351}$ (e.g., insight 108) to hash $H_{353}$ and the data subset 353 associated therewith. Hash functions by their nature provide fast, reliable, and readily differentiable outputs. Accordingly, when a value in a data set varies from a value in an additional data set, even if all other values therein are the same, a new hash for the additional data set will differ from the hash for the (old) data set by many characters.

While hashes are discussed herein, checksums and checksum functions may be used in the place of the hashes and hash functions described herein. Upon even small variances in data used to make a checksum, the checksum for an additional data set with the variance will vary from an existing data set, though typically not by as many characters as a hash.

The database 390 may store the correlations between the hashes and outcomes associated with the data (e.g., values) upon which the hashes are built. For example, the hash $H_{351}$ may be correlated with the insight 108 in the database 390 and the hash $H_{352}$ may be correlated with the discrete decision 104 in the database.

The comparison of hashes and correlation of new hashes to existing outcomes may be carried out separately from running the data through the reasoning graph 100 shown at 391. For example, production of hashes and the examination for match(es) shown at 394 may be carried out prior to running the data through the reasoning functions of the reasoning graph at 391.

Later, new hashes may be compared to the hashes and outcomes stored in the database 390 to determine if there is a match therebetween. If there is no match between a new hash and the hashes in the database 390, then a machine readable program (e.g., code) which examines for the match may be additionally composed to query the data on which the new hash is based to perform the reasoning functions in the reasoning graph. As more data sets are run through the reasoning graph 100, more correlations between hashes and corresponding outcomes are stored in the database 390. Consequently, the probability of unique (e.g., non-matching) hashes decreases and the likelihood of being able to correlate an outcome to a new hash via a match to an existing hash increases, thereby improving the speed and reducing the computational burden of the machine readable program, processor, and/or system which executes same.

Figure 4:
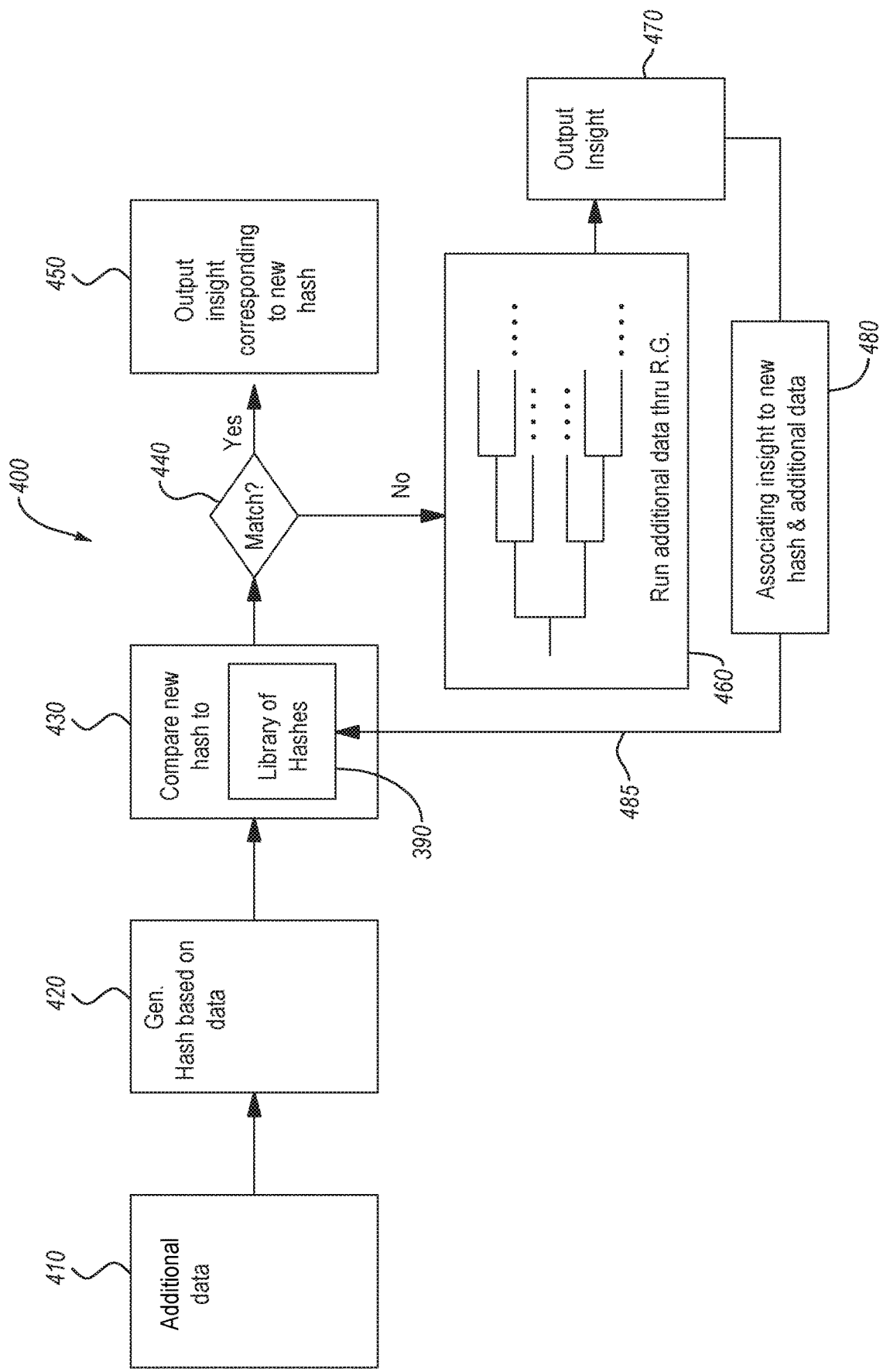
FIG. 4 is a schematic of an algorithm for automatically determining an outcome associated with a reasoning graph, according to an embodiment.

FIG. 4 is a schematic of an algorithm 400 for automatically determining an outcome associated with a reasoning graph, according to an embodiment. The algorithm 400 includes obtaining additional data at block 410. The additional data may include at least one data set having a plurality of values store in individual fields and subsets therein. The additional data may be stored in a database. For example, the additional data may be obtained from a form (e.g., paper form or electronic format) and input into the database. The additional data may be input manually or by electronically transferring the additional data from a first electronic source to the database.

The algorithm 400 includes generating at least one new hash with the additional data at block 420. Generating the at least one new hash with the additional data may include running a hash function with the additional data. Generating the at least one new hash with the additional data may include running a hash function with a subset of the additional data. Generating the at least one new hash may include generating a new hash with the data from one or more fields or subsets of data that are utilized by one or more reasoning functions of a reasoning graph.

The algorithm 400 includes comparing the at least one new hash with at least one existing hash at block 430. The at least one existing hash may be stored in the database 390, such as in a library or look-up table in the database 390. The at least one existing hash may be stored in the database 390 with the corresponding outcome such as an insight or one or more discrete decisions.

The algorithm 400 includes determining if there is a match between the at least one new hash and at least one existing hash as shown at block 440. The determination may be carried out by a processor or computer system. Determining if there is a match may include determining if the value(s) of the new hash matches the value(s) of any of the existing hashes in the database.

If there is a match, the algorithm 400 includes outputting the insight corresponding to the at least one hash and the at least one existing hash as shown at block 450. Outputting the insight may include communicating the insight to a requesting entity (e.g., a company or individual that requested a determination based on the additional data), such as electronically or by some other communication medium. Outputting the insight may include communicating the insight to one or more entities in additional to the requesting entity. For example, communicating the insight may include communicating the insight to an insurance policy holder (which the additional data is based on), a care provider or physician, and the insurance provider.

Outputting the insight may also include outputting one or more of the new hash, at least some of the additional data, or at least some of the reasoning functions of the reasoning graph used to arrive at the insight associated with the new hash.

In some embodiments, the algorithm includes mapping the at least one outcome corresponding to the at least one hash with the at least a portion of the one or more additional data sets used to determine the new hash if the new hash matches the at least one hash. In such embodiments, outputting the insight corresponding to the at least one hash and the at least one existing hash may be performed after mapping the at least one outcome to at least a portion of the one or more additional data sets.

If there is no match, the algorithm 400 includes running at least a portion of the additional data set through the at least one reasoning function of the reasoning graph as shown at block 460. Running at least a portion of the additional data set through the at least one reasoning function of the reasoning graph may be to determine at least one new outcome (e.g., discrete decision(s) and/or insight). Running at least a portion of the additional data set through the at least one reasoning function of the reasoning graph may include using at least the values from fields and subsets of the additional data set that are necessary to answer at least some (e.g., all) of the reasoning functions in a reasoning graph or reasoning path therein.

The algorithm 400 includes outputting the at least one new outcome as shown at 470. Outputting the at least one new outcome may be similar or identical to outputting the insight shown at block 450, in one or more aspects. For example, outputting the at least one new outcome 470 may include outputting a new insight corresponding to the at least one new hash, such as electronically communicating the same.

The algorithm 400 includes associating the at least one new outcome with one or more of the new hash or the at least a portion of the one or more additional data sets used to determine the at least one new outcome as shown at block 480. Associating the at least one new outcome with one or more of the new hash or the at least a portion of the one or more additional data sets used to determine the at least one new outcome may include electronically linking the outcome (e.g., insight) to the additional data set (of one or more additional data sets) used to determine the outcome with the reasoning graph. In some embodiments, the outputting at block 470 may be performed after associating the at least one new outcome shown at block 480.

The algorithm 400 includes storing the associated at least one outcome and at least one hash (or at least one data set used to make the hash) in a database as shown at block 485. In examples, storing the associated at least one outcome and at least one hash may include electronically moving and storing the associated at least one outcome and at least one hash in the database 390. Accordingly, the new hash may be compared to later produced hashes. Thus, the database (or library therein) of hashes and associated outcomes is enlarged by every determination that there is no match between an existing hash and the new hash because a new outcome is determined, associated with a new hash, and stored in such instances.

Generating the at least one new hash may be carried out at a location remote from where the blocks 430-485 are performed. For example, generating the new hash may be performed by a submitting entity that requests disposition of a claim but does not wish to transmit personally identifiable information (e.g., person health information, social security information, etc.). Only the hash may be provided to the entity that performs blocks 430-485. In such embodiments, no personally identifiable information is shared. Accordingly, claims for medical requests may be processed using hashes instead of the personally identifiable information on which the hashes are formed.

Each part of algorithm 400 may be carried out electronically according to one or more computer readable and executable programs. Methods of automatically determining an outcome associated with a reasoning graph may be carried out in general accordance with the algorithm 400.

Figure 5:
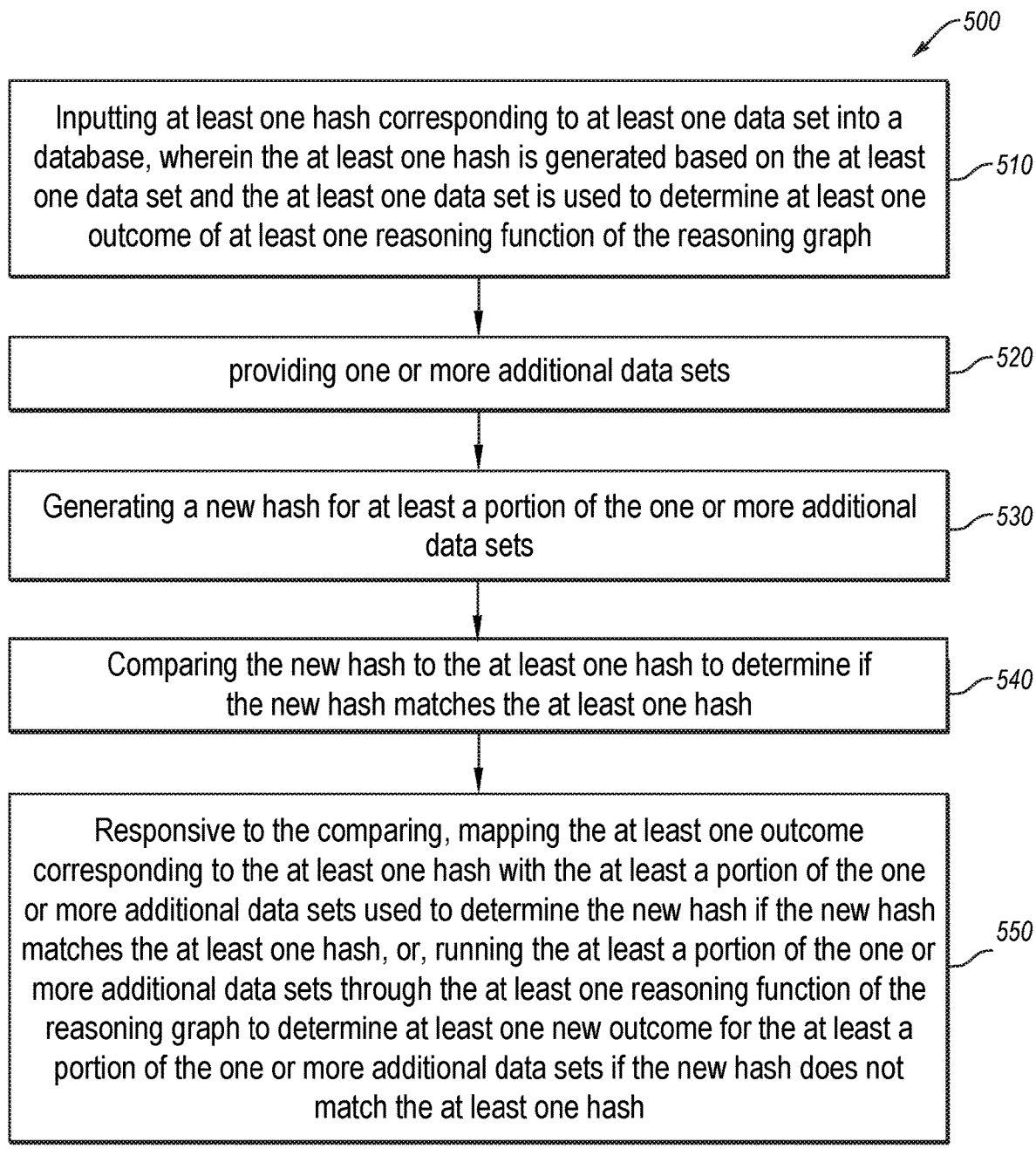
FIG. 5 is a flow chart of a method of automatically determining an outcome associated with a reasoning graph, according to an embodiment.

FIG. 5 is a flow chart of a method 500 of automatically determining an outcome associated with a reasoning graph, according to an embodiment. The method 500 may include the block 510 of inputting at least one hash corresponding to at least one data set into a database, wherein the at least one hash is generated based on the at least one data set and the at least one data set is used to determine at least one outcome of at least one reasoning function of the reasoning graph; the block 520 of providing one or more additional data sets; the block 530 of generating a new hash for at least a portion of the one or more additional data sets; the block 540 of comparing the new hash to the at least one hash to determine if the new hash matches the at least one hash; and the block 550 of responsive to the comparing, mapping the at least one outcome corresponding to the at least one hash with the at least a portion of the one or more additional data sets used to determine the new hash if the new hash matches the at least one hash, or, running the at least a portion of the one or more additional data sets through the at least one reasoning function of the reasoning graph to determine at least one new outcome for the at least a portion of the one or more additional data sets if the new hash does not match the at least one hash. In some embodiments, the blocks 510-550 may be performed in a different order than the order depicted in FIG. 5. In some embodiments, one or more of the blocks 510-550 may be omitted from the method 500, such as block 510 or 520. In some embodiments, additional blocks may be included in the method 500.

The block 510 of inputting at least one hash corresponding to at least one data set into a database, wherein the at least one hash is generated based on the at least one data set and the at least one data set is used to determine at least one outcome of at least one reasoning function of the reasoning graph includes inputting the at least one hash into a database. Inputting at least one hash corresponding to at least one data set into a database may include electronically migrating the at least one hash into the database, such as via a data download or transfer. Inputting at least one hash corresponding to at least one data set into a database may include manually entering the at least one hash into the database, such as via typing the at least one hash into the database.

The at least one data set may include one or more values used by reasoning functions in the reasoning graph, such as to answer queries of the reasoning functions. The at least one hash may be generated using a hash function or checksum function.

The at least one hash may include any type of hash or checksum, such as an MD5 hash, SHA-2 hash, SHA-3 hash, or the like. Inputting at least one hash corresponding to at least one data set into a database includes inputting the at least one hash into the database with the outcome(s) associated therewith. The at least one hash is generated based on the at least one data set and the at least one data set is used to determine at least one outcome of at least one reasoning function of the reasoning graph. In some examples, the at least one hash is based solely on values in the at least one data set, such as solely on values from a single data set of a plurality of data sets in the database. In some embodiments, the at least one hash may be generated based on only a subset of data (e.g., specific values from specific fields and/or subsets) from the at least one data set. For example, a hash function may be composed to generate a hash based only on those values in the at least one data set that are used in the reasoning functions of a reasoning graph or only a limited number of the reasoning functions.

The at least one hash may be associated with an outcome (e.g., discrete decision or insight), such as electronically linked in the database to the discrete decision or insight, where the outcome is reached using the data upon which the at least one hash is generated. In some embodiments, inputting at least one hash corresponding to at least one data set into a database may include inputting the at least one hash into the database with the outcome(s) associated therewith. For example, the at least one hash may be linked (e.g., in machine readable code) to each discrete decision and insight reached using the data that is used to make the at least one hash.

In some embodiments, inputting at least one hash corresponding to at least one data set into a database may include generating a plurality of hashes. In some embodiments, inputting at least one hash corresponding to at least one data set into a database includes generating a plurality of hashes each corresponding to a discrete data set or values therein associated with a respective at least one outcome.

The block 520 of providing one or more additional data sets includes providing one or more sets of data in an electronic, machine readable format. In some embodiments, providing one or more additional data sets may include providing the additional data sets from paper or electronic sources. For example, providing one or more additional data sets may include providing data from a claim, application, requisition, prescription, order, or other request form. Providing one or more additional data sets may include providing data from an electronic source, such as via manually entering the values from fields in a form into a database in corresponding fields therein. Providing one or more additional data sets may include providing data from an electronic source, such as via electronically transferring or migrating the values from fields in an origin data source into corresponding fields in the database. The corresponding fields in the database may be organized in a data set corresponding to a single individual, event, form, entity, etc. Providing one or more additional data sets may include providing one or more sets of data from sources, events, individuals, or entities other than the those that are the source of the at least one data set used to make the at least one hash.

The one or more additional data sets may be presented as a data set with many individual sets of data (e.g., subsets) therein. In some embodiments, the one or more additional sets of data can only include data that is going to be queried by the reasoning functions in a reasoning graph. For example, providing one or more additional data sets may include providing data corresponding to the at least one reasoning function in a reasoning graph. In some embodiments, the one or more additional data sets can include data that applies to only certain reasoning functions (e.g., one or more reasoning functions) in the reasoning graph for which the data is intended.

The block 530 of generating a new hash for at least a portion of the one or more additional data sets includes generating the new hash for each discrete individual, event, request, entity, etc. for which a discrete data set of the one or more additional data sets is collected. For example, a plurality of individuals may provide information including values in fields of a request form and generating a new hash may include generating the new hash for each individual based on the values in the fields corresponding to the respective individual. Accordingly, a plurality of new hashes may be made based on a single data set that contains information from a plurality of individuals, events, entities, requests, etc.

In some embodiments, generating a new hash may include running a hash function or checksum function on the one or more additional data sets. For example, generating a new hash may include running a MD5, SHA-256, SHA-512, or other hash function on the values in the one or more additional data sets that are expected to be utilized by one or more reasoning functions in a reasoning graph. For example, generating the new hash may be based at least in part on values from a plurality of fields of a form, where at least some of the fields correspond to information used to perform the at least one reasoning function in the reasoning graph. The number of values utilized by the hash function or checksum function may be less than all values in the one or more additional data sets, such as only values associated with a selected individual, event, request, etc. The values may be all values in the one or more additional data sets or all values associated with an individual, event, entity, request etc.

In some embodiments, generating a new hash for at least one of the one or more additional data sets may include generating a new hash for each of the one or more additional data sets. In some embodiments, generating a new hash for at least one of the one or more additional data sets may include generating a new hash based solely on values in each of the one or more additional data sets, such as when examining a request based on a cohort or group.

In some embodiments, generating a new hash for at least one of the one or more additional data sets may include generating a new hash at a location or computing device different from the location or computing device that performs other portions of the method 500. For example, a new hash (e.g., MD5 hash) may be generated at a remote location, such as a medical care provider, based on a data set at the remote location. The new hash may be provided to the location or computing device(s) that performs the blocks 510, 520, 540, and 550 of the method 500. By communicating only the new hash, no personally identifiable information is communicated. This reduces the amount of data security that needs to be utilized at the location or computing device(s) that perform the method 500.

The generated new hash(es) may be electronically deposited in a liberty or database for comparison to previously existing hashes.

The block 540 of comparing the new hash to the at least one hash to determine if the new hash matches the at least one hash includes comparing the values of the at least one hash to the values of the new hash(es). In embodiments, comparing the new hash to the at least one hash to determine if the new hash matches the at least one hash includes comparing the new hash to a plurality of hashes corresponding to one or more of the at least one outcome. For example, the new hash may be compared to a plurality of hashes that each correspond to individual insights of a reasoning graph. If the new hash matches one of the plurality of hashes then the insight corresponding to the one of the plurality of hashes is associated (e.g., applies to or is correlated with) with the new hash. Comparing the new hash to the at least one hash to determine if the new hash matches the at least one hash includes comparing the new hash to a plurality of hashes stored in a database (or library therein).

The block 550 of, responsive to the comparing, mapping the at least one outcome corresponding to the at least one hash with the at least a portion of the one or more additional data sets used to determine the new hash if the new hash matches the at least one hash, or, running the at least a portion of the one or more additional data sets through the at least one reasoning function of the reasoning graph to determine at least one new outcome for the at least a portion of the one or more additional data sets if the new hash does not match the at least one hash may include associating (e.g., electronically linking) the insight or discrete decisions corresponding to the at least one hash with the at least one new hash. Mapping may provide an identifiable, computer readable linkage between the new hash (or data associated therewith) and the outcome associated with the at least one hash.

Mapping the at least one outcome corresponding to the at least one hash with the at least a portion of the one or more additional data sets used to determine the new hash may include mapping one or more outcomes to the new hash, such as at least one insight corresponding to the at least one hash and at least one discrete decision corresponding to the at least one hash. Mapping the at least one outcome corresponding to the at least one hash with the at least a portion of the one or more additional data sets used to determine the new hash if the new hash matches the at least one hash may include outputting the at least one outcome to a source linked to the at least a portion of the one or more additional data sets. The source may include a claims request site, an application site, an order site, or any other source from which the one or more additional data sets underlying the new hash is provided or directed. For example, the source may be a medical provider or insurance provider and outputting the at least one outcome to a source linked to the at least a portion of the one or more additional data sets may include communicating (e.g., electronically such as via an e-mail) the at least one outcome to a medical care provider, insurance provider, or the like.

Running the at least a portion of the one or more additional data sets through the at least one reasoning function of the reasoning graph to determine at least one new outcome for the at least a portion of the one or more additional data sets if the new hash does not match the at least one hash may include running at least a portion of at least one of the one or more data sets through at least some of the reasoning functions in a reasoning graph. For example, values from an additional data set corresponding to a discrete individual, claim, entity, event, etc. from the one or more additional data sets may be run through the reasoning functions in a reasoning graph to determine at least one outcome (e.g., discrete decision(s) or insight) corresponding to the values in the additional data set. The at least one outcome may be similar or identical to outcomes stored in the database that are associated with existing hashes therein, but which differ from the new hash (e.g., are based on different values of data). The at least one outcome may be associated (e.g., mapped) to the new hash (and data associated therewith). The new hash and at least one outcome associated therewith may be stored in the database with the existing hashes, thereby increasing the probability of matching later compared newer hashes.

In some embodiments, the at least one outcome may include information of at least a portion of a reasoning path in the reasoning graph corresponding to the at least one data set and the at least a portion of the one or more additional data sets if the new hash matches the at least one hash. In such embodiments, responsive to the comparing, mapping the at least one outcome corresponding to the at least one hash with the at least a portion of the one or more additional data sets used to determine the new hash if the new hash matches the at least one hash includes outputting the at least one outcome corresponding to the at least one hash and the new hash, which includes the information of at least a portion of a reasoning path, to a source linked to the at least a portion of the one or more additional data sets. For example, the at least one outcome may include one or more discrete decisions and/or the insight of a reasoning path resulting from the values of one or more additional data sets which form the basis of the new hash.

In some embodiments, running the at least a portion of the one or more additional data sets through the at least one reasoning function of the reasoning graph to determine at least one new outcome for the at least a portion of the one or more additional data sets if the new hash does not match the at least one hash may include associating (e.g., electronically linking) the at least one new outcome with one or more of the new hash or the at least a portion of the one or more additional data sets used to determine the at least one new outcome. In such embodiments, inputting at least one hash corresponding to at least one data set into a database may include storing the new hash corresponding to the at least one new outcome in the database.

Running the at least a portion of the one or more additional data sets through the at least one reasoning function of the reasoning graph to determine at least one new outcome for the at least a portion of the one or more additional data sets if the new hash does not match the at least one hash may include outputting the at least one new outcome corresponding to the new hash. Outputting the at least one new outcome corresponding to the new hash may include outputting the at least one new outcome to a source linked to the at least a portion of the one or more additional data sets used to make the new hash.

In some embodiments, running the at least a portion of the one or more additional data sets through the at least one reasoning function of the reasoning graph to determine at least one new outcome for the at least a portion of the one or more additional data sets if the new hash does not match the at least one hash includes, running an entire set of data of the one or more additional data sets through a plurality of reasoning functions of the reasoning graph to determine an insight for the at least a portion of the one or more additional data sets, and outputting the insight corresponding to the new hash. For example, all of the values from a discrete data set corresponding to an individual, event, claim, or entity may be run through the reasoning graph to determine at least one outcome associated therewith. Accordingly, the new hash and associated outcome are only associated with the values from the discrete data set.

In some embodiments, each insight may be identified by an insight identifier which identifies a specific reasoning path through the reasoning graph and includes the plurality of reasoning functions on the specific reasoning path. The insight identifier may be a data string or code associated therewith that carries (or corresponds to) the information of the specific reasoning path through the reasoning graph and includes the plurality of reasoning functions on the specific reasoning path. Similar discrete decision identifiers may be utilized to identify discrete decisions based on one or more portions of a reasoning path and one or more reasoning functions therein.

The outcomes associated with the new hash(es) may be input into the database for later comparison to newer hashes.

In some embodiments, when only values from a specific number of fields in a subset are used in a reasoning graph, the hash corresponding thereto may be compared to the at least one hash in the database to determine a match therebetween. If such a match exists, the analysis of the reasoning graph may skip to a point in the reasoning graph for which the data underlying the at least one hash (and new hash) have been used, and the other values from the fields in the subset may be run through one or more remaining reasoning functions in the reasoning graph. Accordingly, some portions of reasoning graphs may be skipped, while others may be performed from values in the same subset of data. Such partial hashing, comparison, and reasoning graph analysis may allow portions of reasoning graphs to be skipped, thereby providing faster processing speeds and less computational demand.

After a portion of the reasoning graph is skipped and one or more additional outcomes are determined, the one or more additional outcomes may be associated with (e.g., electronically linked) a new hash of the entire subset of data, a larger portion of the subset, or a different discrete portion of the subset of data upon which the hash corresponding thereto is generated. Accordingly, the new hash may be associated with outcomes of a larger portion or different portions of the reasoning graph than the original hash which was used to skip a portion of the reasoning graph.

Methods of automatically determining an outcome associated with a reasoning graph may include a piecewise examination of hashes corresponding to data used to arrive at discrete decisions in a reasoning graph. For example, hashes may be made for values that are examined at each reasoning function in a reasoning graph.

Figure 6:
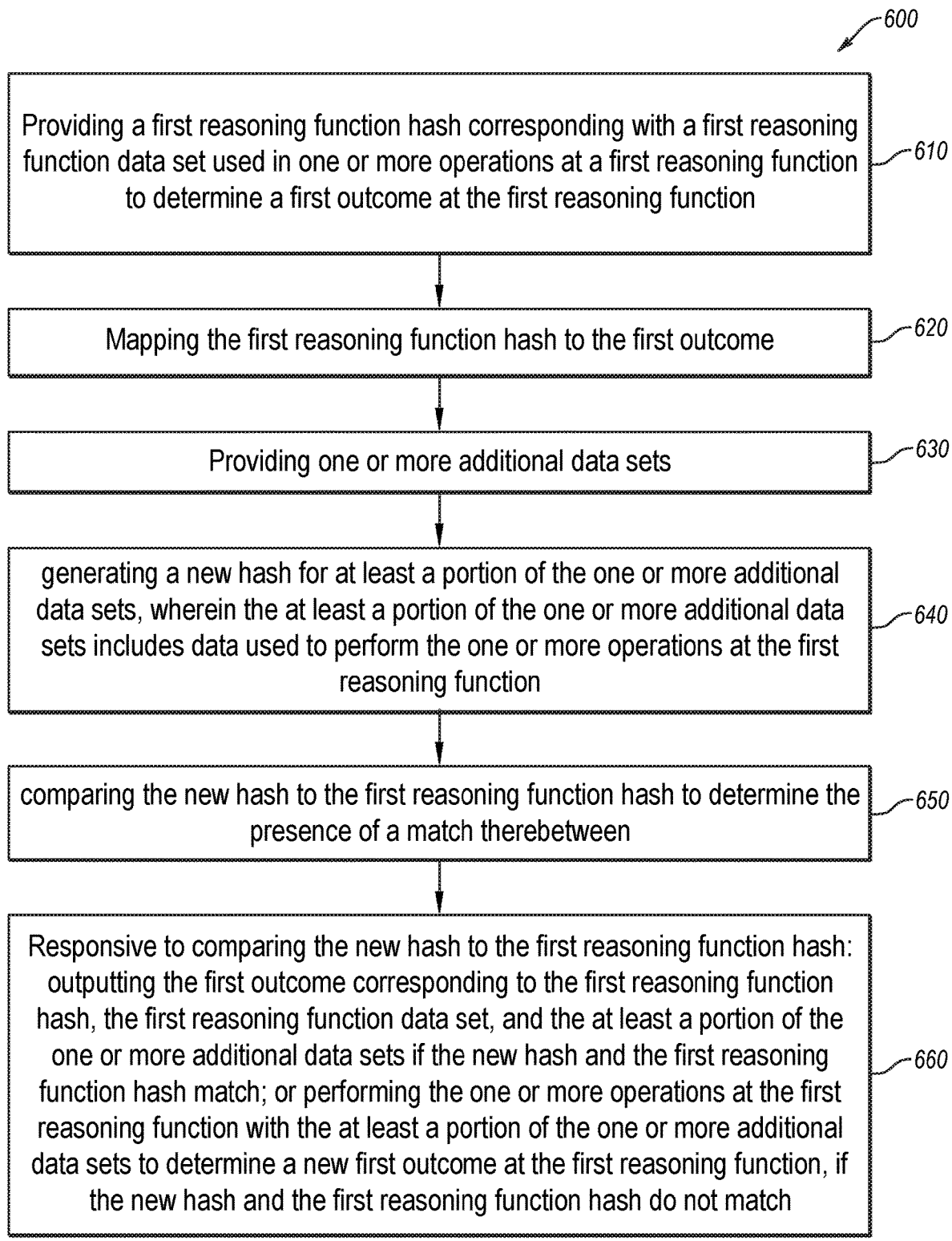
FIG. 6 is a flow chart of a method of automatically determining an outcome associated with a reasoning graph, according to an embodiment.

FIG. 6 is a flow chart of a method 600 of automatically determining an outcome associated with a reasoning graph, according to an embodiment. The method 600 may include the block 610 of providing a first reasoning function hash corresponding with a first reasoning function data set used in one or more operations at a first reasoning function to determine a first outcome at the first reasoning function; the block 620 of mapping the first reasoning function hash to the first outcome; the block 630 of providing one or more additional data sets; the block 640 of generating a new hash for at least a portion of the one or more additional data sets, wherein the at least a portion of the one or more additional data sets includes data used to perform the one or more operations at the first reasoning function; the block 650 of comparing the new hash to the first reasoning function hash to determine the presence of a match therebetween; the block 660 of responsive to comparing the new hash to the first reasoning function hash, outputting the first outcome corresponding to the first reasoning function hash, the first reasoning function data set, and the at least a portion of the one or more additional data sets if the new hash and the first reasoning function hash match, or, performing the one or more operations at the first reasoning function with the at least a portion of the one or more additional data sets to determine a new first outcome at the first reasoning function, if the new hash and the first reasoning function hash do not match. In some embodiments, the blocks 610-660 may be performed in a different order than the order depicted in FIG. 6. In some embodiments, one or more of the blocks 610-660 may be omitted from the method 600, such as block 610. In some embodiments, additional blocks may be included in the method 600.

The block 610 of providing a first reasoning function hash corresponding with a first reasoning function data set used in one or more operations at a first reasoning function to determine a first outcome at the first reasoning function may include providing a hash corresponding to the values of data from a first reasoning function data set that are used to perform the first reasoning function in a reasoning graph. For example, providing a first reasoning function hash corresponding with a first reasoning function data set used in one or more operations at the first reasoning function to determine a first outcome at the first reasoning function may include generating the first reasoning function hash based at least in part on values from a plurality of fields of a form, where at least some of the values correspond to information used to perform one or more reasoning functions of the reasoning graph. Generating the first reasoning function hash may be similar or identical to generating the new hash for at least a portion of the one or more additional data sets disclosed above in block 530, in one or more aspects.

Providing a first reasoning function hash corresponding with a first reasoning function data set used in one or more operations at a first reasoning function to determine a first outcome at the first reasoning function may include inputting at least one hash corresponding to at least one data set into a database, wherein the at least one hash is generated based on the at least one data set and the at least one data set is used to determine at least one outcome of at least one reasoning function of the reasoning graph.

The block 620 of mapping the first reasoning function hash to the first outcome may be similar or identical to mapping the at least one outcome corresponding to the at least one hash with the at least a portion of the one or more additional data sets used to determine the new hash if the new hash matches the at least one hash as disclosed with respect to the method 500, in one or more aspects. For example, mapping may provide an identifiable, computer readable linkage between the first reasoning function hash (or data associated therewith) and the first outcome associated therewith.

Mapping the first reasoning function hash to the first outcome may include outputting the at least one first outcome to a source linked to the at least a portion of the one or more additional data sets. For example, the source may be a medical provider or insurance provider and outputting the at least first outcome to a source linked to the at least a portion of the one or more additional data sets may include communicating (e.g., electronically such as via an e-mail) the at least one outcome to one or more of the medical provider or insurance provider.

The block 630 of providing one or more additional data sets may be similar or identical to the block 520 of providing one or more additional data sets in one or more aspects. In some embodiments, providing one or more additional data sets may include providing one or more data sets corresponding to a different individual, event, entity, claim, etc. than the data associated with the first reasoning function hash. Providing one or more additional data sets may include transferring values (e.g., data sets) from a form, database, library, etc. to a database which is queried by a hash function to form a hash. Such transfer may include manually entering the values (e.g., typing), migrating the values (e.g., electronic file transfer), or the like.

The block 640 of generating a new hash for at least a portion of the one or more additional data sets, wherein the at least a portion of the one or more additional data sets includes data used to perform the one or more operations at the first reasoning function may be similar or identical to the block 530 of generating a new hash for at least a portion of the one or more additional data sets disclosed herein, in one or more aspects. For example, generating a new hash may include running a hash function or checksum function on the at least a portion of the one or more additional data sets. For example, generating a new hash may include running a MD5, SHA-256, SHA-512, or other hash function on the values in the one or more additional data sets that are expected to be utilized by one or more reasoning functions in a reasoning graph.

Generating a new hash for at least a portion of the one or more additional data sets may include generating the new hash for the at least a portion of the one or more additional data sets based solely on one or more values therein. Generating a new hash for at least a portion of the one or more additional data sets may include generating the new hash based at least in part on values from a plurality of fields of a form, and wherein at least some of the fields correspond to information used to perform one or more reasoning functions such as the first reasoning function. The new hash may be output to the database which contains the first reasoning function hash and any other pre-existing hashes (along with their associated outcomes).

The block 650 of comparing the new hash to the first reasoning function hash to determine the presence of a match therebetween may be similar or identical to the block 540 of comparing the new hash to the at least one hash to determine if the new hash matches the at least one hash as disclosed herein, in one or more aspects. For example, comparing the new hash to the first reasoning function hash to determine the presence of a match therebetween may include comparing the values of the new hash (e.g., hash values) to the values of at least one hash to determine if there is a match therebetween. In embodiments, comparing the new hash to the at least one hash to determine if the new hash matches the at least one hash includes comparing the new hash to a plurality of hashes corresponding to one or more of the at least one outcome. For example, the new hash may be compared to a plurality of hashes that each correspond to individual insights of a reasoning graph. If the new hash matches one of the plurality of hashes then the insight corresponding to the one of the plurality of hashes is associated (e.g., applies to or is correlated with) with the new hash. Comparing the new hash to the at least one hash to determine if the new hash matches the at least one hash includes comparing the new hash to a plurality of hashes stored in a database (or library therein).

The block 660 of responsive to comparing the new hash to the first reasoning function hash, outputting the first outcome corresponding to the first reasoning function hash, the first reasoning function data set, and the at least a portion of the one or more additional data sets if the new hash and the first reasoning function hash match, or, performing the one or more operations at the first reasoning function with the at least a portion of the one or more additional data sets to determine a new first outcome at the first reasoning function, if the new hash and the first reasoning function hash do not match, may be similar or identical to the block 550 in one or more aspects.

In some embodiments, outputting the at least one first outcome to a source linked to the at least a portion of the one or more additional data sets may include communicating the at least one first outcome to a second portion of a machine readable and executable program, such as to trigger a response thereto. Such responses can include instructions to skip the at least the first reasoning function(s) in the reasoning graph. In some embodiments, outputting the at least one first outcome to a source linked to the at least a portion of the one or more additional data sets may include communicating the at least one first outcome to a requesting entity (e.g., a company or individual that requested a determination based on the additional data), such as electronically or by some other communication medium. Outputting the at least one first outcome may include communicating one or more of the at least one first outcome, the first reasoning function hash, the first reasoning function data set, or the at least a portion of the one or more additional data sets, to one or more entities in addition to the requesting entity. For example, communicating the at least one first outcome may include communicating the at least one first outcome to an insurance policy holder (which the additional data is based on), a care provider or physician, and the insurance provider.

Performing the one or more operations at the first reasoning function with the at least a portion of the one or more additional data sets to determine a new first outcome at the first reasoning function, if the new hash and the first reasoning function hash do not match may be similar or identical to running the at last a portion of the one or more additional data sets through the at least one reasoning function of the reasoning graph described at block 550. Performing the one or more operations at the first reasoning function with the at least a portion of the one or more additional data sets to determine a new first outcome at the first reasoning function, if the new hash and the first reasoning function hash do not match may include applying one or more values from the at least a portion of one or more additional data sets (e.g., discrete values therein) corresponding to the queries in the at least a first reasoning function. For example, performing the one more operations may include determining if a value of data exceeds or falls short of a threshold value. Performing the one more operations of a reasoning function may include determining if a value in the data set provides a positive or negative indication of some element, such as a diagnosis.

In some embodiments, the method 600 may be used to determine a plurality of first outcomes for each of a plurality of discrete data sets or subsets in a data set. In such embodiments, providing a first reasoning function hash corresponding with a first reasoning function data set used in one or more operations at the first reasoning function to determine a first outcome at the first reasoning function may include providing a plurality of first reasoning function hashes corresponding with a plurality of first reasoning function data sets used in one or more operations at the first reasoning function to determine a plurality of first outcomes at the first reasoning function. In such embodiments, mapping the first reasoning function hash to the first outcome may include mapping each of the plurality of first reasoning function hashes to a corresponding one of the plurality of first reasoning function data sets used to determine a corresponding one of the plurality of first outcomes at the first reasoning function as disclosed herein. In such embodiments, comparing the new hash to the first reasoning function hash to determine the presence of a match therebetween may include comparing the new hash to the plurality of first reasoning function hashes to determine a presence of a match therebetween. In such embodiments, outputting the outcome corresponding to the first reasoning function hash, the first reasoning function data set, and the at least a portion of the one or more additional data sets if the new hash and the first reasoning function hash match may include outputting one of the plurality of first outcomes corresponding to one of the plurality of first reasoning function hashes that matches the new hash.

The method 600 may include repeating the providing, mapping, providing, generating, comparing, and outputting or performing with at least a second new hash corresponding to at least a second portion of the one or more additional data sets. Repeating the providing, mapping, providing, generating, comparing, and outputting or performing with at least a second new hash corresponding to at least a second portion of the one or more additional data sets may include incrementally working through a reasoning graph with data from the one or more additional data sets to determine one or more outcomes (e.g., additional discrete decisions and insights). For example, repeating the providing, mapping, providing, generating, comparing, and outputting or performing with at least a second reasoning function hash corresponding to at least a portion of the one or more additional data sets may include providing at least a second reasoning function hash corresponding with the at least a second reasoning function data set used in one or more operations at the at least a second reasoning function to determine at least a second outcome at the at least a second reasoning function; mapping the at least a second reasoning function hash to the at least a second outcome; generating the at least a second new hash for the at least a second portion of the one or more additional data sets, wherein the at least a second portion of the one or more additional data sets includes data used to perform the one or more operations at the at least a second reasoning function; comparing the at least a second new hash to the at least a second reasoning function hash to determine a presence of a match therebetween; and responsive to comparing the at least a second new hash to the at least a second reasoning function hash outputting the at least a second outcome corresponding to the at least a second reasoning function hash, the at least a second reasoning function data set, and the one or more additional data sets, if the at least a second new hash and the at least a second reasoning function hash match; or performing the one or more operations at the at least a second reasoning function with the at least a second portion of the one or more additional data sets to determine at least a second new outcome at the at least a second reasoning function based on the at least a second portion of the one or more additional data sets, if the at least a second new hash and the at least a second reasoning function hash do not match. Such acts advance toward a final outcome (e.g., insight) of the reasoning graph with the at least one additional data set. For example, at least a second outcome corresponding to the at least a second reasoning function hash may include an insight.

In some embodiments, the repeating the providing, mapping, providing, generating, comparing, and outputting or performing blocks (e.g., acts) may be serially repeated for each reasoning function and value in the at least one additional data set, until an insight is reached. Each of the repeated providing, mapping, providing, generating, comparing, and outputting or performing blocks (e.g., acts) may be similar or identical to the providing, mapping, providing, generating, comparing, and outputting or performing blocks disclosed herein with respect to the first reasoning function or entire reasoning graph, in one or more aspects. The respective outcomes (e.g., insights) of the repeated blocks may include an insight identifier that includes information of each reasoning function of a reasoning path in the reasoning graph.

Any of the acts disclosed with respect to the method 500 or method 600 may be used with methods of determining an outcome, such as with a computer system or network. An act disclosed herein with respect to the algorithm 400, method 500, or method 600 may be a part of (e.g., a subroutine) of a computer readable and executable program.

Figure 7:
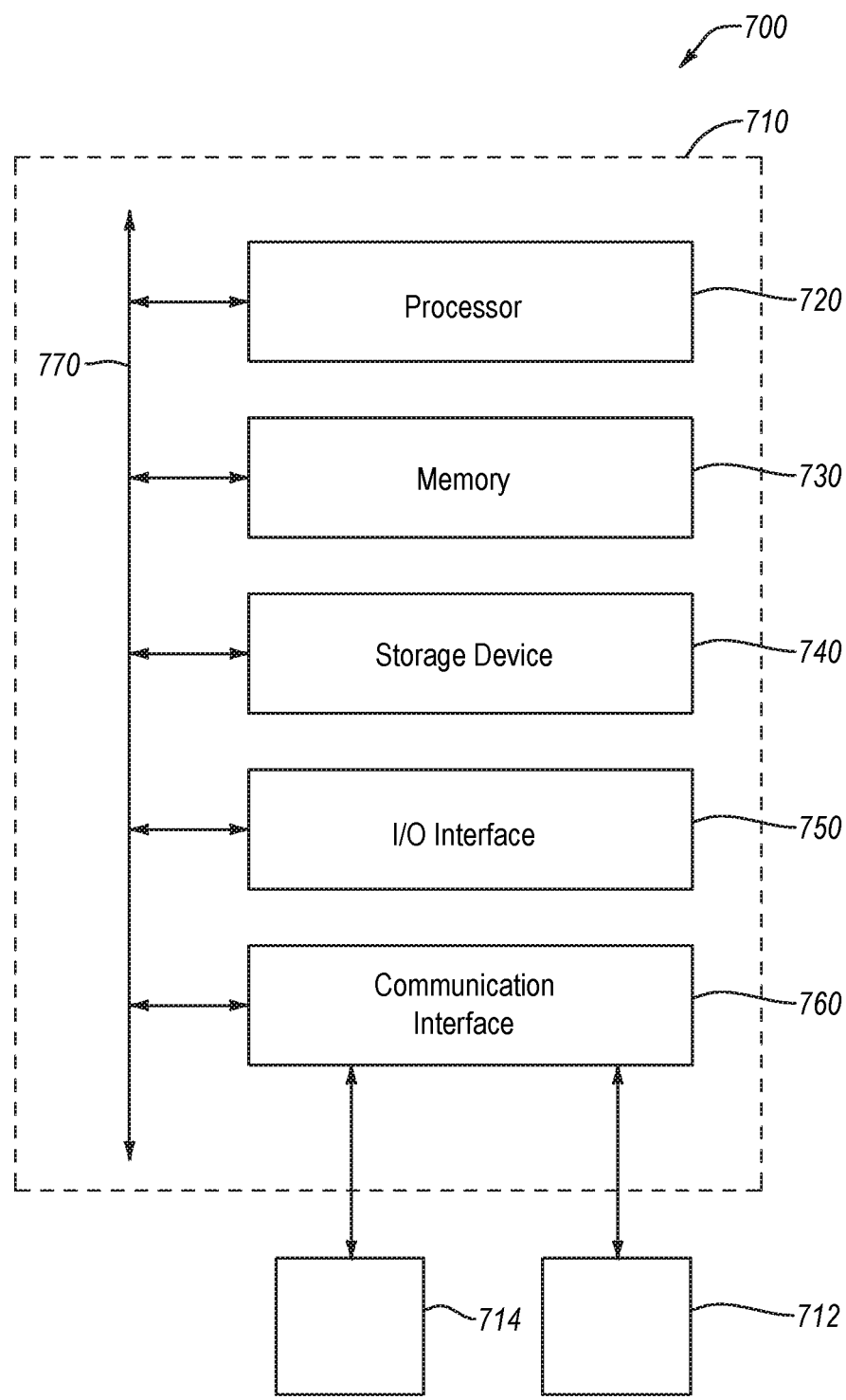
FIG. 7 is a schematic of a system for executing any of the methods disclosed herein, according to an embodiment.

FIG. 7 is a schematic of a system 700 for executing any of the methods disclosed herein, according to an embodiment. The system 700 may be configured to implement any of the methods disclosed herein, such as the algorithm 400, method 500, or method 600. The system 700 includes at least one computing device 710. In some embodiments, the system 700 may include one or more additional computing devices 712, such as operably coupled thereto over a network connection. The at least one computing device 710 is an exemplary computing device that may be configured to perform one or more of the acts described herein, such as any of the algorithm 400, method 500, or method 600. The at least one computing device 710 can include one or more servers, one or more computers (e.g., desk-top computer, lap-top computer), one or more mobile computing devices (e.g., smartphone, tablet, etc.), or the like. The computing device 710 can comprise at least one processor 720, memory 730, a storage device 740, an input/output ("I/O") interface 750, and a communication interface 760. While an example computing device 710 is shown in FIG. 7, the components illustrated in FIG. 7 are not intended to be limiting of the system 700 or computing device 710. Additional or alternative components may be used in some embodiments. Further, in some embodiments, the system 700 or the computing device 710 can include fewer components than those shown in FIG. 7. For example, the system 700 may not include the one or more additional computing devices 712. In some embodiments, the at least one computing device 710 may include a plurality of computing devices, such as a server farm, computational network, or cluster of computing devices. Components of computing device 710 shown in FIG. 7 are described in additional detail below.

In some embodiments, the processor(s) 720 includes hardware for executing instructions (e.g., running the reasoning functions in the computer code or executing the hash function), such as those making up a computer program. For example, to execute instructions, the processor(s) 720 may retrieve (or fetch) the instructions from an internal register, an internal cache, the memory 730, or a storage device 740 and decode and execute them. In particular embodiments, processor(s) 720 may include one or more internal caches for data sets, reasoning graphs, reasoning functions, hashes, etc. As an example, the processor(s) 720 may include one or more instruction caches, one or more data caches, and one or more translation lookaside buffers (TLBs). Instructions in the instruction caches may be copies of instructions in memory 730 or storage 740. In some embodiments, the processor 720 may be configured (e.g., include programming stored thereon or executed thereby) to carry out one or more portions of any of the methods disclosed herein.

In some embodiments, the processor 720 is configured to perform any of the acts disclosed herein such as in algorithm 400, method 500, or method 600 or cause one or more portions of the computing device 710 or system 700 to perform at least one of the acts disclosed herein. Such configuration can include one or more operational programs (e.g., machine readable computer program products) that are executable by the at least one processor 720. For example, the processor 720 may be configured to automatically generate a new hash based on at least a portion of an additional data set, or compare the new hash with one or more existing hashes. The at least one processor 720 may be configured to output the insight associated with the new hash to the user interface or an additional computing device.

The at least one computing device 710 may include at least one non-transitory memory storage medium (e.g., memory 730 and/or storage 740). The computing device 710 may include memory 730, which is operably coupled to the processor(s) 720. The memory 730 may be used for storing build tools, source code, data, metadata, and computer programs, and executable computer programs for execution by the processor(s) 720. The memory 730 may include one or more of volatile and non-volatile memories, such as Random Access Memory (RAM), Read Only Memory (ROM), a solid state disk (SSD), Flash, Phase Change Memory (PCM), or other types of data storage. The memory 730 may be internal or distributed memory.

The computing device 710 may include the storage device 740 having storage for storing data sets, hashes, reasoning graphs, reasoning functions, instructions, etc. The storage device 740 may be operably coupled to the at least one processor 720. In some embodiments, the storage device 740 can comprise a non-transitory memory storage medium, such as any of those described above. The storage device 740 (e.g., non-transitory memory storage medium) may include a hard disk drive (HDD), a floppy disk drive, flash memory, an optical disc, a magneto-optical disc, magnetic tape, or a Universal Serial Bus (USB) drive or a combination of two or more of these. Storage device 740 may include removable or non-removable (or fixed) media. Storage device 740 may be internal or external to the computing device 710. In some embodiments, storage device 740 may include non-volatile, solid-state memory. In some embodiments, storage device 740 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

In some embodiments, one or more of source code, build tools, data, remote location addresses, computer programs, executable computer programs, etc., may be stored in a memory storage medium such as one or more of the at least one processor 720 (e.g., internal cache of the processor), memory 730, or the storage device 740. In some embodiments, the at least one processor 720 may be configured to access (e.g., via bus 770) the memory storage medium(s) such as one or more of the memory 730 or the storage device 740. For example, the at least one processor 720 may receive and store the data (e.g., databases, data sets, form data, reasoning graphs, reasoning functions, etc.) as a plurality of data points in the memory storage medium(s). The at least one processor 720 may execute the reasoning functions, hash functions, etc., such as to determine discrete decisions and insights or to build hashes, as directed by an executable computer program using data sets, reasoning functions, hash functions, etc. For example, the at least one processor 720 may access machine readable and executable program code or portions thereof (e.g., individual blocks or subroutines) in the memory storage medium(s) such as memory 730 or storage device 740 to execute the same.

The computing device 710 also includes one or more I/O devices/interfaces 750, which are provided to allow a user to provide input to, receive output from, and otherwise transfer data to and from the computing device 710. These I/O devices/interfaces 750 may include a mouse, keypad or a keyboard, touch screen, screen, camera, optical scanner, network interface, web-based access, modem, a port, other known I/O devices or a combination of such I/O devices/interfaces 750. The touch screen may be activated with a stylus or a finger.

The I/O devices/interfaces 750 may include one or more devices for presenting output to a user, including, but not limited to, a graphics engine, a display (e.g., a display screen or monitor), one or more output drivers (e.g., display drivers), one or more audio speakers, and one or more audio drivers. In certain embodiments, devices/interfaces 750 are configured to provide graphical data (e.g., a portal and/or textual explanations) to a display (e.g., home or office computer screen) for presentation to a user. The graphical data may be representative of one or more graphical user interfaces and/or any other graphical content as may serve a particular implementation.

The computing device 710 can further include a communication interface 760. The communication interface 760 can include hardware, software, or both. The communication interface 760 can provide one or more interfaces for communication (such as, for example, packet-based communication) between the computing device 710 and one or more additional computing devices 712 or one or more networks. For example, communication interface 760 may include a network interface controller (NIC) or network adapter for communicating with an Ethernet or other wire-based network or a wireless NIC (WNIC) or wireless adapter for communicating with a wireless network, such as a WI-FI.

Any suitable network and any suitable communication interface 760 may be used. For example, computing device 710 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, one or more portions of system 700 or computing device 710 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 710 may include any suitable communication interface 760 for any of these networks, where appropriate.

In some embodiments, the computing device 710 may include a computer or server having a network connection, and the computer or server includes programming therein adapted to output the outcomes, data sets, reasoning graphs (or portions thereof), the computer program, the executable computer program, etc.

The computing device 710 may include a bus 770. The bus 770 can include hardware, software, or both that couples components of computing device 710 to each other. For example, bus 770 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

It should be appreciated that any of the acts described herein, such as in the algorithm 400, method 500, or method 600 may be performed by and/or at the computing device 710. Additionally or alternatively, one or more of the acts described herein may be performed by or at another computing device such as additional computing device 712. For example, some of the acts disclosed herein may be performed by or on a personal computing device of the user (e.g., additional computing device 712), such as a personal computer, smart phone, etc., (e.g., receiving electronic messages), while one or more of the acts may be performed by another computing device (e.g., computing device 710), such as a server, that may be operably connected to the personal computing device of the user. Accordingly, one or more elements of system 700 can be remotely distributed from one another and/or one or more elements of the system 700 can be collocated. For example, inputting the data sets, generating a new hash, or requesting a determination of an outcome based thereon may be performed via the additional computing device 712, such as by a requesting party manually providing the data sets (e.g., values from fields of a form) into the computing device 710 via the additional computing device 712 or 714 over a network connection, or, by automatically transferring the same via a data transfer routine, order, dump, or other mechanism. In some embodiments, the data sets, reasoning graphs (or portions thereof), or the executable computer program may be displayed on the additional computing device 712, such as via a web or network connection either directly or indirectly from the additional computing device 712 to the computing device 710.

One or more of the acts described herein may be performed by or at another computing device such as additional computing device 714. For example, the additional computing device 714 may be at a customer's home and at least some of the outcomes may be provided by the additional computing device 712 of a service provider that the customer (e.g., patient, loan applicant, etc.) visited. A request for a claim based on service the customer received by the service provider may be communicated to the computing device 710 of an approval agency (e.g., insurance provider, loan underwriter, etc.) by the additional computing device 712 of the service provider for determination of an outcome (e.g., approval of loan, prescription request, or insurance claim). Upon determining the outcome, the computing device 710 may communicate the outcome to one or more of the additional computing devices 712 and 714, such as to both the customer and the service provider.

Machine readable computer programs may be composed to carry out one or more of the blocks, or acts of any of the methods disclosed herein. The machine readable computer programs may include source code, byte code, bit code, or any other type of computer readable or executable code. The machine readable computer programs disclosed herein may be provided in a computer program product. In some examples, one or more reasoning functions, reasoning graphs, data sets, hash functions, hashes, etc. may be included in machine readable and executable instructions (e.g., computer programs).

Figure 8:
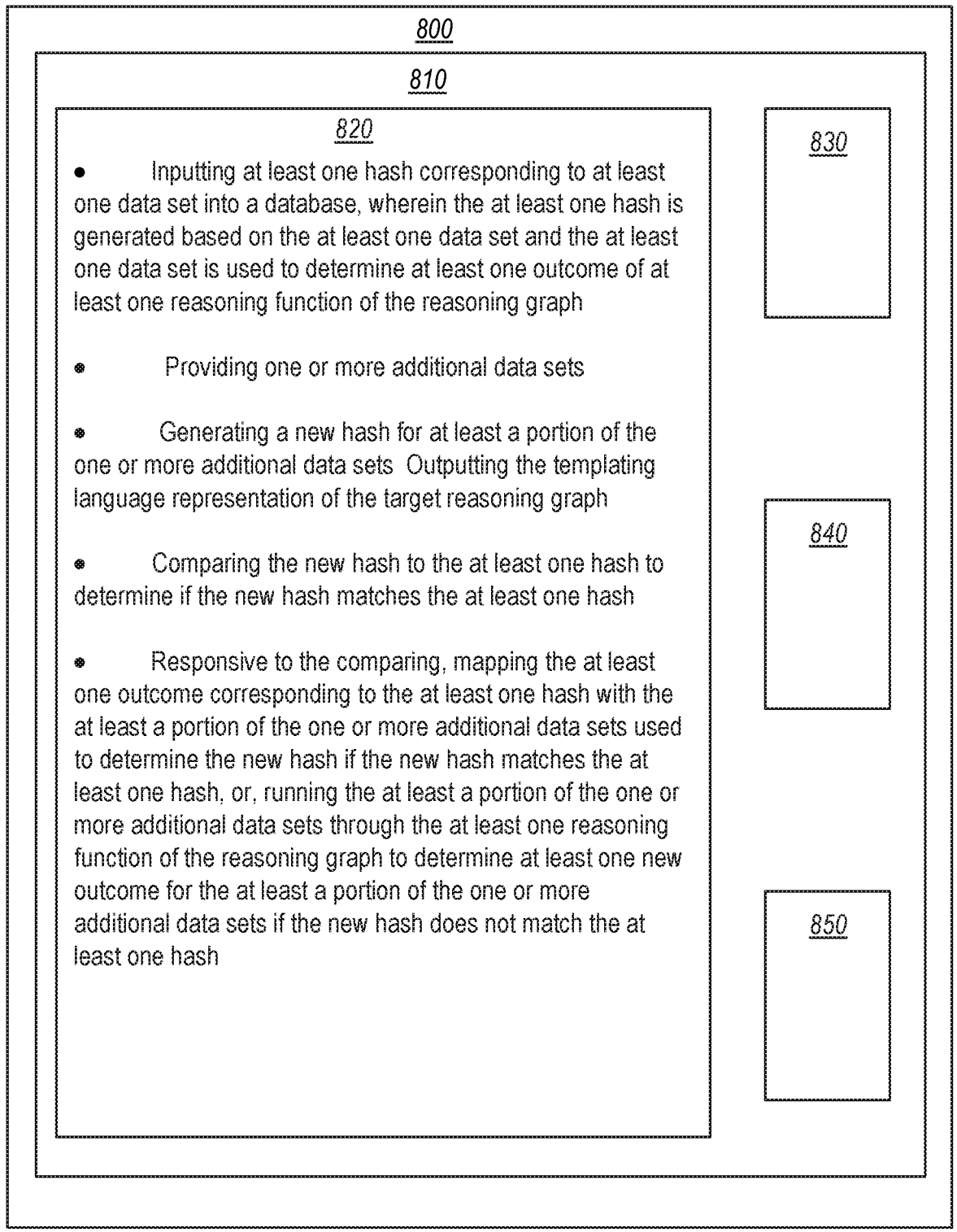
FIG. 8 is a block diagram of an example computer program product, according to an embodiment.

FIG. 8 is a block diagram of an example computer program product 800, according to an embodiment. The computer program product 800 is arranged to store instructions for a method of automatically determining an outcome associated with a reasoning graph as disclosed herein. The non-transitory signal bearing medium 810 may include a computer-readable medium 830 (e.g., read-only memory, RAM, hard drive such as a magnetic disc drive or solid state disc, flash memory stick, internal cache of a processor, or optical disc), a computer recordable medium 840 (e.g., RAM, hard drive, memory stick, optical disc, etc.), a computer communications medium 850 (e.g., internal cache of a BUS, etc.), or combinations thereof, stores programming instructions 820 (e.g., computer code) that may configure the processing unit of an associated computer storing the same to perform all or some of the methods or acts described herein. The instructions may include, for example, one or more machine-readable and executable instructions for "inputting at least one hash corresponding to at least one data set into a database, wherein the at least one hash is generated based on the at least one data set and the at least one data set is used to determine at least one outcome of at least one reasoning function of the reasoning graph; providing one or more additional data sets; generating a new hash for at least a portion of the one or more additional data sets; comparing the new hash to the at least one hash to determine if the new hash matches the at least one hash; and responsive to the comparing, mapping the at least one outcome corresponding to the at least one hash with the at least a portion of the one or more additional data sets used to determine the new hash if the new hash matches the at least one hash, or, running the at least a portion of the one or more additional data sets through the at least one reasoning function of the reasoning graph to determine at least one new outcome for the at least a portion of the one or more additional data sets if the new hash does not match the at least one hash," as disclosed herein.

In some embodiments, the instructions may include any portions of the algorithm 400, method 500, or method 600 disclosed herein, in any combination. For example, the instructions may include one repeating the providing, mapping, providing, generating, comparing, and outputting or performing with at least a second reasoning function hash corresponding to at least a portion of the one or more additional data sets of the method 600.

The computer program product may include modules composed to perform each of the acts disclosed with respect to the algorithm 400, method 500, or method 600. For example, the computer program product may include a machine readable program stored on a non-transitory computer readable medium (e.g., memory storage). The machine readable program may include an input module configured for accepting input of at least one hash corresponding to at least one data set, the at least one data set, a reasoning graph, one or more additional data sets, one or more new hashes, as disclosed in the algorithm 400, method 500, or method 600 herein. The reasoning graph may include one or more reasoning functions and associated discrete decisions associated therewith, a plurality of leaf nodes each defining an insight, a plurality of reasoning paths each terminating at a leaf node, wherein each reasoning function defines a portion of the plurality of reasoning paths and defines queries and inputs for making a discrete decision with data at a specific point along a selected reasoning path.

The machine readable program may include a comparison module for comparing the at least one hash to the one or more new hashes to determine a match therebetween, as disclosed in the algorithm 400, method 500, or method 600 herein. The machine readable program may include a mapping module configured to map at least one outcome corresponding to the at least one hash to the at least a portion of the one or more additional data sets used to determine the one or more new hashes if any of the one or more new hashes matches the at least one hash, as disclosed in the algorithm 400, method 500, or method 600 herein.

The machine readable program may include an analysis module configured to run the at least a portion of the one or more additional data sets through at least one reasoning function of the plurality of reasoning functions in the reasoning graph to determine at least one new outcome for the at least a portion of the one or more additional data sets if any of the one or more new hashes do not match the at least one hash, as disclosed in the algorithm 400, method 500, or method 600 herein. The machine readable program may include an output module configured to output the at least one outcome if any of the one or more new hashes match the at least one hash or output the at least one new outcome if any of the one or more new hashes do not match the at least one hash, as disclosed in the algorithm 400, method 500, or method 600 herein.

The machine readable program may include a hash generation module configured to automatically generate the one or more new hashes based on at least a portion of the one or more additional data sets and automatically communicating the one or more new hashes to the input module, as disclosed in the algorithm 400, method 500, or method 600 herein.

The methods, computer program products, and systems disclosed herein provide a number of improvements to current computer systems and methods for determining outcomes using reasoning graphs or reasoning functions. The methods, computer program products, and systems disclosed herein reduce or eliminate the need to run data through at least a portion of reasoning graphs to determine an outcome therewith, all while maintaining the accuracy of the outcomes by utilizing hash functions to determine if at least some values in data sets match, and then associating the known outcomes for preexisting hashes with the requests corresponding to a new, matching hash. By skipping to the outcome of the matching hash, at least some of the reasoning functions corresponding to the outcome may be omitted in providing an outcome for the new data set (or values or subsets therein) associated with the new hash. This results in a drastic improvement of processing speed and computational burden required to process a request for a determination of outcome based on the new data set.

While various aspects and embodiments have been disclosed herein, other aspects and embodiments are contemplated. The various aspects and embodiments disclosed herein are for purposes of illustration and are not intended to be limiting.

What is claimed is:

1. A method of automatically determining an outcome associated with a reasoning graph, the method comprising:
   inputting at least one hash corresponding to at least one data set into a database, wherein the at least one hash is generated based on the at least one data set and the at least one data set is used to determine at least one outcome of at least one reasoning function of the reasoning graph;
   providing one or more additional data sets;
   generating a new hash for at least a portion of the one or more additional data sets;
   comparing the new hash to the at least one hash to determine if the new hash matches the at least one hash; and
   responsive to the comparing, mapping the at least one outcome corresponding to the at least one hash with the at least a portion of the one or more additional data sets used to determine the new hash if the new hash matches the at least one hash, or, running the at least a portion of the one or more additional data sets through the at least one reasoning function of the reasoning graph to determine at least one new outcome for the at least a portion of the one or more additional data sets if the new hash does not match the at least one hash, wherein:
   running the at least a portion of the one or more additional data sets through the at least one reasoning function of the reasoning graph to determine at least one new outcome for the at least a portion of the one or more additional data sets if the new hash does not match the at least one hash includes running an entire set of data of the one or more additional data sets through a plurality of reasoning functions of the reasoning graph to determine an insight for the at least a portion of the one or more additional data sets, and outputting the insight corresponding to the new hash, and wherein the insight is identified by an insight identifier which identifies a specific reasoning path through the reasoning graph and includes the plurality of reasoning functions on the specific reasoning path.

2. The method of claim 1, wherein inputting at least one hash corresponding to at least one data set into a database includes generating the at least one hash based at least in part on values from a plurality of fields of a form, and wherein at least some of the fields correspond to information used to perform the at least one reasoning function.

3. The method of claim 1, wherein inputting at least one hash corresponding to at least one data set into a database includes generating a plurality of hashes each corresponding to a discrete data set associated with a respective at least one outcome.

4. The method of claim 1, wherein the at least one hash is based solely on values of the at least one data set.

5. The method of claim 1, wherein providing one or more additional data sets includes providing data from a claim form.

6. The method of claim 1, wherein providing one or more additional data sets includes providing data corresponding to the at least one reasoning function.

7. The method of claim 1, wherein generating a new hash for at least one of the one or more additional data sets includes generating a new hash for each of the one or more additional data sets.

8. The method of claim 1, wherein generating a new hash for at least one of the one or more additional data sets includes generating a new hash based solely on values in each of the one or more additional data sets.

9. The method of claim 1, wherein comparing the new hash to the at least one hash to determine if the new hash matches the at least one hash includes comparing values of the at least one hash with values of the new hash.

10. The method of claim 1, wherein comparing the new hash to the at least one hash to determine if the new hash matches the at least one hash includes comparing the new hash to a plurality of hashes corresponding to one or more of the at least one outcome.

11. The method of claim 1, wherein mapping the at least one outcome corresponding to the at least one hash with the at least a portion of the one or more additional data sets used to determine the new hash if the new hash matches the at least one hash includes outputting the at least one outcome to a source linked to the at least a portion of the one or more additional data sets.

12. The method of claim 1, wherein:
   the at least one outcome includes information of at least a portion of a reasoning path in the reasoning graph corresponding to the at least one data set and the at least a portion of the one or more additional data sets if the new hash matches the at least one hash; and responsive to the comparing, mapping the at least one outcome corresponding to the at least one hash with the at least a portion of the one or more additional data sets used to determine the new hash if the new hash matches the at least one hash includes outputting the at least one outcome corresponding to the at least one hash and the new hash, which includes the information of at least a portion of a reasoning path, to a source linked to the at least a portion of the one or more additional data sets.

13. The method of claim 1, wherein:

running the at least a portion of the one or more additional data sets through the at least one reasoning function of the reasoning graph to determine at least one new outcome for the at least a portion of the one or more additional data sets if the new hash does not match the at least one hash includes associating the at least one new outcome with one or more of the new hash or the at least a portion of the one or more additional data sets used to determine the at least one new outcome; and inputting at least one hash corresponding to at least one data set into a database includes storing the new hash corresponding to the at least one new outcome in the database.

14. The method of claim 1, wherein running the at least a portion of the one or more additional data sets through the at least one reasoning function of the reasoning graph to determine at least one new outcome for the at least a portion of the one or more additional data sets if the new hash does not match the at least one hash includes outputting the at least one new outcome corresponding to the new hash.

15. A method of automatically determining an outcome associated with a reasoning graph, the method comprising:

providing a first reasoning function hash corresponding with a first reasoning function data set used in one or more operations at a first reasoning function to determine a first outcome at the first reasoning function;

mapping the first reasoning function hash to the first outcome;

providing one or more additional data sets;

generating a new hash for at least a portion of the one or more additional data sets, wherein the at least a portion of the one or more additional data sets includes data used to perform the one or more operations at the first reasoning function;

comparing the new hash to the first reasoning function hash to determine the presence of a match therebetween; and responsive to comparing the new hash to the first reasoning function hash:

outputting the first outcome corresponding to the first reasoning function hash, the first reasoning function data set, and the at least a portion of the one or more additional data sets if the new hash and the first reasoning function hash match; or if the new hash and the first reasoning function hash do not match, performing the one or more operations at the first reasoning function with the at least a portion of the one or more additional data sets to determine a new first outcome at the first reasoning function;

repeating the providing, mapping, providing, generating, comparing, and outputting or performing with at least a second new hash corresponding to at least a second portion of the one or more additional data sets, including:

providing at least a second reasoning function hash corresponding with the at least a second reasoning function data set used in one or more operations at the at least a second reasoning function to determine at least a second outcome at the at least a second reasoning function;

mapping the at least a second reasoning function hash to the at least a second outcome;

generating the at least a second new hash for the at least a second portion of the one or more additional data sets, wherein the at least a second portion of the one or more additional data sets includes data used to perform the one or more operations at the at least a second reasoning function;

comparing the at least a second new hash to the at least a second reasoning function hash to determine a presence of a match therebetween; and responsive to comparing the at least a second new hash to the at least a second reasoning function hash: outputting the at least a second outcome corresponding to the at least a second reasoning function hash, the at least a second reasoning function data set, and the one or more additional data sets, if the at least a second new hash and the at least a second reasoning function hash match; or performing the one or more operations at the at least a second reasoning function with the at least a second portion of the one or more additional data sets to determine at least a second new outcome at the at least a second reasoning function based on the at least a second portion of the one or more additional data sets, if the at least a second new hash and the at least a second reasoning function hash do not match, wherein:

the at least a second outcome corresponding to the at least a second reasoning function hash includes an insight and the insight includes an insight identifier that includes information of each reasoning function of a reasoning path in the reasoning graph.

16. The method of claim 15, wherein providing a first reasoning function hash corresponding with a first reasoning function data set used in one or more operations at the first reasoning function to determine a first outcome at the first reasoning function includes generating the first reasoning function hash based at least in part on values from a plurality of fields of a form, and wherein at least some of the values correspond to information used to perform one or more reasoning functions of the reasoning graph.

17. The method of claim 15, wherein generating a new hash for at least a portion of the one or more additional data sets includes generating the new hash based at least in part on values from a plurality of fields of a form, and wherein at least some of the fields correspond to information used to perform one or more reasoning functions of first reasoning function.

18. The method of claim 15, wherein:

providing a first reasoning function hash corresponding with a first reasoning function data set used in one or more operations at the first reasoning function to determine a first outcome at the first reasoning function includes providing a plurality of first reasoning function hashes corresponding with a plurality of first reasoning function data sets used in one or more operations at the first reasoning function to determine a plurality of first outcomes at the first reasoning function; and mapping the first reasoning function hash to the first outcome includes mapping each of the plurality of first reasoning function hashes to a corresponding one of the plurality of first reasoning function data sets used to determine a corresponding one of the plurality of first outcomes at the first reasoning function.

19. The method of claim 18, wherein:
comparing the new hash to the first reasoning function hash to determine the presence of a match therebetween includes comparing the new hash to the plurality of first reasoning function hashes to determine a presence of a match therebetween; and
responsive to comparing the new hash to the first reasoning function hash, outputting the outcome corresponding to the first reasoning function hash, the first reasoning function data set, and the at least a portion of the one or more additional data sets if the new hash and the first reasoning function hash match includes outputting one of the plurality of first outcomes corresponding to one of the plurality of first reasoning function hashes that matches the new hash.

20. The method of claim 15, wherein generating a new hash for at least a portion of the one or more additional data sets includes generating the new hash for the at least a portion of the one or more additional data sets based solely on one or more values therein.

21. The method of claim 15, wherein comparing the new hash to the first reasoning function hash to determine a presence of a match therebetween includes comparing values of the new hash with values of the first reasoning function hash.

22. A computer program product for automatically determining an outcome of at least a portion of a reasoning graph, the computer program product comprising:
a machine readable program stored on a non-transitory computer readable medium, the machine readable program including:
an input module configured for accepting input of:
at least one hash corresponding to at least one data set;
a reasoning graph, wherein the reasoning graph includes:
a plurality of leaf nodes each defining an insight;
a plurality of reasoning paths each terminating at a leaf node, and
a plurality of reasoning functions, wherein each reasoning function defines a portion of the plurality of reasoning paths and defines queries and inputs for making a discrete decision with data at a specific point along a selected reasoning path;
one or more additional data sets;
one or more new hashes corresponding to at least a portion of the one or more additional data sets;
a comparison module for comparing the at least one hash to the one or more new hashes to determine a match therebetween;
a mapping module configured to map at least one outcome corresponding to the at least one hash to the at least a portion of the one or more additional data sets used to determine the one or more new hashes if any of the one or more new hashes matches the at least one hash;
an analysis module configured to run the at least a portion of the one or more additional data sets through at least one reasoning function of the plurality of reasoning functions in the reasoning graph to determine at least one new outcome for the at least a portion of the one or more additional data sets if any of the one or more new hashes do not match the at least one hash; and
an output module configured to output the at least one outcome if any of the one or more new hashes match the at least one hash or output the at least one new outcome if any of the one or more new hashes do not match the at least one hash, wherein running the at least a portion of the one or more additional data sets through the at least one reasoning function of the reasoning graph to determine at least one new outcome for the at least a portion of the one or more additional data sets if the new hash does not match the at least one hash includes running an entire set of data of the one or more additional data sets through a plurality of reasoning functions of the reasoning graph to determine an insight for the at least a portion of the one or more additional data sets, and outputting the insight corresponding to the new hash, and wherein the insight is identified by an insight identifier which identifies a specific reasoning path through the reasoning graph and includes the plurality of reasoning functions on the specific reasoning path.

23. The computer program product of claim 22, further comprising a hash generation module configured to automatically generate the one or more new hashes based on at least a portion of the one or more additional data sets and automatically communicating the one or more new hashes to the input module.

* * * * *